(12) United States Patent
Tsutsui et al.

(10) Patent No.: US 6,963,860 B1
(45) Date of Patent: Nov. 8, 2005

(54) INFORMATION RECORDING AND REPRODUCING SYSTEM AND METHOD AND DISTRIBUTION MEDIUM

(75) Inventors: Kyoya Tsutsui, Kanagawa (JP); Osamu Shimoyoshi, Kanagawa (JP); Hiroyuki Honma, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/373,895

(22) Filed: Aug. 12, 1999

(30) Foreign Application Priority Data

Aug. 13, 1998 (JP) .............................. P10-228804

(51) Int. Cl.[7] ............................................ G06F 17/60
(52) U.S. Cl. ......................................... 705/52; 705/51
(58) Field of Search ......................... 705/51, 52, 500,
705/53; 327/350, 352, 355, 356; 375/240.11,
375/240.21; 386/109, 122, 124, 131, 68,
386/22, 19; 704/230; 725/103, 104; 369/94,
369/59.16; 713/165; 360/132; 348/613

(56) References Cited

U.S. PATENT DOCUMENTS

| | | | | |
|---|---|---|---|---|
| 4,658,093 A | * | 4/1987 | Hellman ....................... | 705/52 |
| 5,126,846 A | * | 6/1992 | Niimura .................. | 327/350 X |
| 5,469,212 A | * | 11/1995 | Lee .................... | 375/240.21 X |
| 5,646,992 A | * | 7/1997 | Subler et al. ................. | 705/53 |
| 5,822,291 A | * | 10/1998 | Brindze et al. ............... | 369/94 |
| 6,014,468 A | * | 1/2000 | McCarthy et al. ........... | 382/254 |
| 6,026,164 A | * | 2/2000 | Sakamoto et al. ............ | 380/10 |
| 6,314,391 B1 | * | 11/2001 | Tsutsui et al. ............... | 704/214 |
| 6,363,175 B1 | * | 3/2002 | Scheirer et al. ............. | 382/232 |
| 6,510,515 B1 | * | 1/2003 | Raith ......................... | 713/163 |

FOREIGN PATENT DOCUMENTS

| | | |
|---|---|---|
| EP | 0 404 465 A2 | * 12/1990 |
| EP | 0 817 414 A2 | * 1/1998 |

OTHER PUBLICATIONS

Rubin, Aviel D., "Secure Distribution of Electronic Documents in a Hostile Environment", Computer Communications, NL, Elsevier Science Publishers B1, Amsterdam, vol. 18, No. 6, pp. 429-434, Jun. 1, 1995.*

* cited by examiner

*Primary Examiner*—John W. Hayes
(74) *Attorney, Agent, or Firm*—Sonnenschein, Nath & Rosenthal LLP

(57) ABSTRACT

To make it possible to provide high-quality music signal regardless of the advertising voice superimposing position, an encrypted pure music signal input through a transmission medium and an unencrypted advertising voice signal are separated by a signal string separation section. A signal transform and combining section decodes the encrypted pure music signal and combines the decoded music signal with the advertising voice signal into a resultant signal of the music and advertising voice signals, then outputs the resultant signal to a code string combining section, which then combines the encrypted pure music signal and the resultant signal of the music and advertising voice signals and supplies the result to a recording section for recording the result on a magneto-optic disc.

6 Claims, 36 Drawing Sheets

TRANSMISSION SYSTEM

| A | B | A⊕B | A⊕B⊕B |
|---|---|-----|-------|
| 0 | 0 | 0 | 0 |
| 0 | 1 | 1 | 0 |
| 1 | 0 | 1 | 1 |
| 1 | 1 | 0 | 1 |

INFORMATION RECORDING AND REPRODUCING SYSTEM AND METHOD AND DISTRIBUTION MEDIUM

BACKGROUND OF THE INVENTION

1. Field of the Invention

This invention relates to an information recording and reproducing system and method and a distribution medium and in particular to an information recording and reproducing system and method and a distribution medium capable of providing a user with predetermined information from a plurality of types of information as required.

2. Description of the Related Art

A software distribution method is known wherein acoustic signals, etc., of a piece of music, for example, are encrypted and broadcasted or are recorded on a record medium and only the person buying a key is allowed to listen to the piece of music. Known as an encryption method is a method wherein, for example, an initial value of a random number sequence is given as a key signal and a bit string resulting from exclusive-ORing the random number sequence of "0" or "1" generated and a bit string of PCM of an acoustic signal is transmitted or is recorded on a record medium. This method makes it possible for only the person taking possession of a key signal to be able to reproduce the acoustic signal and for the person not taking possession of the key signal to be able to reproduce only noise.

On the other hand, a method of compressing an acoustic signal and broadcasting the compressed signal or recording the compressed signal on a record medium becomes pervasive and is used to record signals of audio, voice, etc., coded on a record medium such as a magneto-optic disc. Various techniques of highly efficient coding of signals of audio, voice, etc., are available; for example, the following coding techniques can be named: Band split coding (subband coding (SBC)) of an unblock frequency band splitting method of splitting audio signal, etc., on the time axis into frequency bands and coding without blocking and a block frequency band splitting method of transforming a signal on the time axis into a signal on the frequency axis (spectrum transform) and splitting the signal into frequency bands and coding for each band, so-called transform coding.

A highly efficient coding technique using the subband coding (SBC) and the transform coding in combination is also possible. In this case, for example, band splitting is executed according to the subband coding, then the signal for each band is spectrum-transformed into a signal on the frequency axis and coding is executed for each band provided by the spectrum transform.

For example, a QMF filter is available as a filter for executing the band splitting; it is described in 1976 R. E. Crochiere Digital coding of speech in subbands Bell Syst. Tech. J. Vol. 55, No. 8 1976.

A filter splitting method of an equal bandwidth is described in

ICASSP 83, BOSTON Polyphase Quadrature filters—A new subband coding technique

Joseph H. Rothweiler

Further, the spectrum transform includes, for example, spectrum transform wherein, for example, an input audio signal is blocked according to a predetermined unit time (frame) and discrete Fourier transform (DFT), discrete cosine transform (DCT), modified discrete cosine transform (MDCT), etc., are executed for each block, whereby the time axis is transformed into the frequency axis. The MDCT is described in

ICASSP 1987

Subband/Transform Coding

Using Filter Bank Designs Based on Time Domain Aliasing Cancellation

J. P. Princen A. B. Bradley Univ. of Surrey Royal Melbourne Inst. of Tech.

When the DFT or the DCT is used as a method of transforming a waveform signal into a spectrum, if transform is executed in a time block consisting of M samples, M independent real data pieces are provided. To decrease connection distortion between time blocks, normally the block is made to overlap both adjacent blocks each M1 samples. Thus, for (M–M1) samples, M real data pieces are quantized and coded in the DFT or the DCT on average.

In contrast, if the MDCT is used as a method of transforming into a spectrum, M independent real data pieces are provided from 2M samples made to overlap both adjacent times each M pieces. Thus, for M samples, M real data pieces are quantized and coded in the MDCT on average. In a decoder, waveform elements provided by executing inverse transform in each block from the code thus provided using the MDCT are added together while they are made to interfere with each other, whereby the waveform signal can be reconstructed.

Generally, the time block for transform is lengthened, whereby the spectrum frequency resolution is raised and energy concentrates on a specific spectrum component. Therefore, the block is made to overlap both adjacent blocks each a half, transform is executed in long block length, and moreover the MDCT is used wherein the number of spectrum signals provided does not increase with respect to the number of original time samples, whereby it is made possible to execute more efficient coding as compared with the case where the DFT or the DCT is used. The adjacent blocks are provided with sufficiently long overlap, whereby distortion between the blocks of waveform signal can also be decreased.

The quantization noise occurring band can be controlled by quantizing the signal split for each band through the filter or by the spectrum transform in such a manner, and the nature of the masking effect, etc., can be used to execute more highly efficient coding as auditory sense. If normalization is executed for each band before execution of quantization, for example, with the maximum value of the absolute values of signal components in the band, furthermore highly efficient coding can be executed.

For example, band splitting considering the auditory characteristic of a human being is executed as the frequency split width for quantizing each frequency component subjected into frequency band splitting. That is, audio signal may be split into bands (for example, 25 bands) with band width such that the band width widens as the band becomes higher generally called critical band. At this time, to code data for each band, the data is coded based on predetermined bit assignment for each band or adaptive bit allocation for each band. For example, when coefficient data provided by performing MDCT processing is coded according to bit allocation, the MDCT coefficient data for each band provided by performing MDCT processing for each block is coded according to the adaptive number of allocated bits. As bit allocation techniques, the techniques described in the following documents are known:

Adaptive Transform Coding of Speech Signals
R. Zelinski and P. Noll
IEEE Transactions of Acoustics, Speech, and, Signal Processing, vol.ASSP-25, No. 4, August 1977 describe a technique of allocating bits based on the signal magnitude for each band. In this technique, a quantization noise spectrum becomes flat and noise energy reaches the minimum, but as the auditory sense, the masking effect is not used and thus the actual noise feel is not optimum feel.
ICASSP 1980
The critical band coder
—digital encoding of the perceptual requirements of the auditory system
M. A. Kransner MIT describes a technique wherein auditory masking is used for obtaining signal-to-noise ratio required for each band and fixed bit allocation is executed. In this technique, however, to measure the characteristic on sine wave input, bit allocation is also fixed and thus the characteristic value does not become a very good value. To solve this problem, a highly efficient coder is proposed wherein all bits used for bit allocation are divided into those for a fixed bit allocation pattern predetermined for each small block and those for bit allocation depending on the signal magnitude in each block, the division ratio is made to depend on the signal related to an input signal, and the smoother the signal spectrum, the larger the division ratio to the bits for a fixed bit allocation pattern.

According to the method, if energy concentrates on specific spectrum as with sine wave input, many bits are allocated to the block containing the spectrum, whereby the whole signal-to-noise characteristic can be improved remarkably. Generally, the auditory sense of a human being is extremely sensitive to a signal having a steep spectrum component. Thus, improving the signal-to-noise characteristic by using such a method not only leads to improving the numeric value on measurement, but also is effective for improving the sound quality on the auditory sense.

In addition to the bit allocation method, a large number of methods are proposed. If the model for the auditory sense is made finer and the capability of a coder is enhanced, more highly efficient coding is enabled from the viewpoint of the auditory sense. In the methods, it is a common practice to find such a real bit allocation reference value to realize the signal-to-noise characteristic found by calculation as faithfully as possible and adopt the integer value approximating the real bit allocation reference value as the number of allocated bits.

The present applicant previously proposed a method of separating the tone component particularly important on the auditory sense, namely, the signal component with energy concentrating on a specific frequency periphery from a spectrum signal and coding the signal component aside from any other spectrum component, whereby it is made possible to code an audio signal, etc., efficiently at a high compression rate scarcely causing degradation on the auditory sense (Japanese Patent Application NO. Hei 7-500482).

To form an actual code string, first, quantization precision information and normalization coefficient information may be coded in a predetermined number of bits for each band where normalization and quantization are executed, next a normalized and quantized spectrum signal may be coded.
ISO/IEC 11172-3:1993 (E)

describes a highly efficient coding technique set so that the number of bits representing quantization precision information varies from one band to another as standardization wherein the number of bits representing quantization precision information lessens as the band becomes higher.

A method of determining the quantization precision information from the normalization coefficient information, for example, in a decoder instead of directly coding the quantization precision information is also known. However, in this method, when a standard is set, the relationship between the quantization precision information and normalization coefficient information is determined, thus it is made impossible to introduce control of quantization precision based on a more advanced auditory sense model in the future. If there is a width of the compression rates realized, it becomes necessary to define the relationship between the normalization coefficient information and quantization precision information for each compression rate.

A more efficient coding method is also known wherein a quantized spectrum signal is coded using variable-length code, for example, described in
D. A. Huffman: A Method for Construction of Minimum Redundancy Codes, Proc. I.R.E., 40, p. 1098 (1952).

It is also possible to encrypt a signal coded as described above as with PCM signal and distribute the encrypted signal. In this case, the person not taking possession of the key signal cannot reproduce the original signal. A method of converting a PCM signal into a random signal and then coding the signal for compression rather than encrypting a coded bit string is also available. In this case, the person not taking possession of the key signal can reproduce only noise.

However, in the scrambling methods, if the signal is reproduced without the key or by a normal reproducer, noise results and the contents of the software cannot be understood. Thus, the methods cannot be used for applications wherein, for example, a disc on which music is recorded with comparatively low sound quality is distributed and the person listening to the music recorded on the disc purchases a key only to his or her favorite piece of music so that he or she can play back the piece of music with high sound quality, or he or she can listen to software before purchasing a new disc on which the software is recorded with high sound quality.

Hitherto, to encrypt a highly efficiently coded signal, it has been difficult not to degrade the compression efficiency while giving a significant code string for a normal reproducer. That is, as described above, when a code string provided by highly efficient coding is scrambled, if the code string is reproduced, noise occurs and in addition, the reproducer does not operate at all if the scrambled code string does not comply with the standard of the original highly efficient coding. In contrast, if a PCM signal is scrambled and then highly efficiently coded, as the information amount is cut using the nature of the auditory sense, it becomes difficult to descramble correctly because the signal resulting from scrambling the PCM signal cannot always be reproduced when the highly efficiently coded signal is decoded. Thus, a method capable of descrambling correctly needs to be selected as the compression method even if the efficiency is degraded.

In view of the actual circumstances, the applicant proposed a method of coding the components of all bands of audio signal as shown in FIG. 1 and formatting with frames as record units, then recording the result on a record medium as shown in FIG. 2 and a method of separating audio signal into low-band signals (Q(1) to Q(C)) and high-band signals (Q(C+1) to Q(B)) and encrypting only the high-band portions (R(Q(C+1)) to R(Q(B))) as shown in FIG. 3, thereby enabling the listener to understand the contents of the low-band signals recorded with sound quality with narrow reproduction band with no key and requesting the user to determine whether or not he or she is to take possession of the key required for decoding the high-band portions based on the listening result (Japanese Patent Application No. Hei 8-288542).

The applicant also proposed a method wherein an acoustic signal of commentary voice added to an acoustic signal of music, etc., is coded in a first coding method and a cancel signal for canceling the acoustic signal of commentary voice is coded by a second coding method with added processing of encryption, etc., as shown in FIG. 4, whereby the listener can play back the music signal with the commentary voice using a reproducer that can decode and reproduce only the code provided by the first coding method and can play back the pure music signal with the commentary voice canceled using a reproducer that can decode and reproduce the code provided by the first and second coding methods (Japanese Patent Application No. Hei 9-301093).

However, in the method of canceling the commentary voice by the cancel signal, for example, if it becomes necessary to insert commentary voice into a silent part of music data, quantization noise occurring for the commentary voice signal and that occurring for the commentary voice cancel signal do not completely cancel out and moreover a signal for masking noise (music) does not exist, thus noise is conspicuous in the silent section of music. Thus, to insert commentary voice, it is necessary to device a plan for skipping a silent part, etc.

SUMMARY OF THE INVENTION

It is therefore an object of the invention to make it possible to easily provide high-quality information and low-quality information for a demonstration purpose while suppressing noise conspicuous particularly in a silent-section.

According to the invention, there is provided an information recording and reproducing system comprising generation means for generating second information from first information which is input, combining means for combining the second information generated by the generation means with the first input information, and record means for recording the information provided by the combining means on a record medium.

According to the invention, there is provided an information recording and reproducing method comprising the generation step of generating second information from first information which is input, the combining step of combining the second information generated at the generation step with the first input information, and the record step of recording the information provided at the combining step on a record medium.

According to the invention, there is provided a distribution medium for distributing a computer-readable program for causing an information recording and reproducing system to execute processing comprising the generation step of generating second information from first information which is input, the combining step of combining the second information generated at the generation step with the first input information, and the record step of recording the information provided at the combining step on a record medium.

According to the invention, there is provided an information recording and reproducing system comprising first providing means for providing first information coded in a first coding system, second providing means for providing second information, signal transform and combining means for coding the first information and the second information in a second coding system, combining means for combining the first information and the second information undergoing signal transform and combining performed by the signal transform and combining means with the first information which is input, and record means for recording the information provided by the combining means on a record medium.

According to the invention, there is provided an information recording and reproducing method comprising the providing step of providing first information coded in a first coding system, the providing step of providing second information, the combining and coding step of combining and coding the first information and the second information in a second coding system, the combining step of combining the first information and the second information provided at the combining and coding step with the first information which is input, and the record step of recording the information provided at the combining step on a record medium.

According to the invention, there is provided a distribution medium for distributing a computer-readable program for causing an information recording and reproducing system to execute processing comprising the providing step of providing first information coded in a first coding system, the providing step of providing second information, combining and coding step of combining and coding the first information and the second information in a second coding system, the combining step of combining the first information and the second information provided at the combining and coding step with the first information which is input, and the record step of recording the information provided at the combining step on a record medium.

According to the invention, there is provided an information recording and reproducing system comprising first providing means for providing first information coded in a first coding system, second providing means for providing second information, coding means for coding the first information and the second information in a second coding system, encryption means for encrypting the first information based on cipher key information, combining means for combining the first information and the second information coded by the coding means with the first information encrypted by the encryption means, and record means for recording the information provided by the combining means on a record medium.

According to the invention, there is provided an information recording and reproducing method comprising the first providing step of providing first information coded in a first coding system, the second providing step of providing second information, the coding step of coding the first information and the second information in a second coding system, the encryption step of encrypting the first information based on cipher key information, the combining step of combining the first information and the second information coded at the coding step with the first information encrypted at the encryption step, and the record step of recording the information provided at the combining step on a record medium.

According to the invention, there is provided a distribution medium for distributing a computer-readable program for causing an information recording and reproducing system to execute processing comprising the first providing step of providing first information coded in a first coding system, the second providing step of providing second information, the coding step of coding the first information and the second information in a second coding system, the encryption step of encrypting the first information based on cipher key information, the combining step of combining the first information and the second information coded at the coding step with the first information encrypted at the encryption step, and the record step of recording the information provided at the combining step on a record medium.

According to the invention, there is provided an information recording and reproducing system comprising reproduction means for reproducing information recorded on a record medium, first decoding means for decoding first information encrypted from the information reproduced by the reproduction means, transform means for transforming the first information coded in a first coding system, decoded by the first decoding means into code in a second coding system as second information, and record means for recording the second information provided by the transform means on the record means.

According to the invention, there is provided an information recording and reproducing method comprising the reproduction step of reproducing information recorded on a record medium, the first decoding step of decoding first information encrypted from the information reproduced at the reproduction step, the transform step of transforming the first information coded in a first coding system, decoded at the first decoding step into code in a second coding system as second information, and the record step of recording the second information provided at the transform step on the record means.

According to the invention, there is provided a distribution medium for distributing a computer-readable program for causing an information recording and reproducing system to execute processing comprising the reproduction step of reproducing information recorded on a record medium, the first decoding step of decoding first information encrypted from the information reproduced at the reproduction step, the transform step of transforming the first information coded in a first coding system, decoded at the first decoding step into code in a second coding system as second information, and the record step of recording the second information provided at the transform step on the record means.

According to the invention, there is provided an information recording and reproducing system comprising reproduction means for reproducing from the record medium recording first information coded in a first coding system and second information coded in a second coding system, the second information, transform means for transforming the second information reproduced by the reproduction means into code in the first coding system as third information, and record means for recording the third information provided by the transform means on the record means.

According to the invention, there is provided an information recording and reproducing method comprising the reproduction step of reproducing from the record medium recording first information coded in a first coding system and second information coded in a second coding system, the second information, the transform step of transforming the second information reproduced at the reproduction step into code in the first coding system as third information, and the record step of recording the third information provided at the transform step on the record means.

According to the invention, there is provided a distribution medium for distributing a computer-readable program for causing an information recording and reproducing system to execute processing comprising the reproduction step of reproducing from the record medium recording first information coded in a first coding system and second information coded in a second coding system, the second information, the transform step of transforming the second information reproduced at the reproduction step into code in the first coding system as third information, and the record step of recording the third information provided at the transform step on the record means.

In the information recording and reproducing system, the information recording and reproducing method, and the distribution means of the invention, the second information generated from the first information input is combined with the first information and the resultant information is recorded on the record medium.

In the information recording and reproducing system, the information recording and reproducing method, and the distribution means of the invention, the first information is coded in the second coding system together with the second information and is recorded on the record medium together with the first information coded in the first coding system.

In the information recording and reproducing system, the information recording and reproducing method, and the distribution means of the invention, the first information coded in the first coding system is encrypted based on the cipher key information.

In the information recording and reproducing system, the information recording and reproducing method, and the distribution means of the invention, the first information coded in the first coding system and encrypted is extracted from the information recorded on the record medium and is transformed in the second coding system as the second information, which is then recorded on the record medium.

In the information recording and reproducing system, the information recording and reproducing method, and the distribution means of the invention, the second information is reproduced from the record medium recording the first information coded in the first coding system and the second information coded in the second coding system and is transformed in the first coding system as the third information, which is then recorded on the record medium.

DESCRIPTION OF THE PREFERRED EMBODIMENT

An embodiment of the invention will be discussed. To clarify the correspondence between the means of the invention and the components of the embodiment, in parentheses following each means, the corresponding component of the embodiment (as an example) is added for describing the features of the invention as follows: (However, the description does not mean that the means are not limited to those described, of course.)

Figure 6:
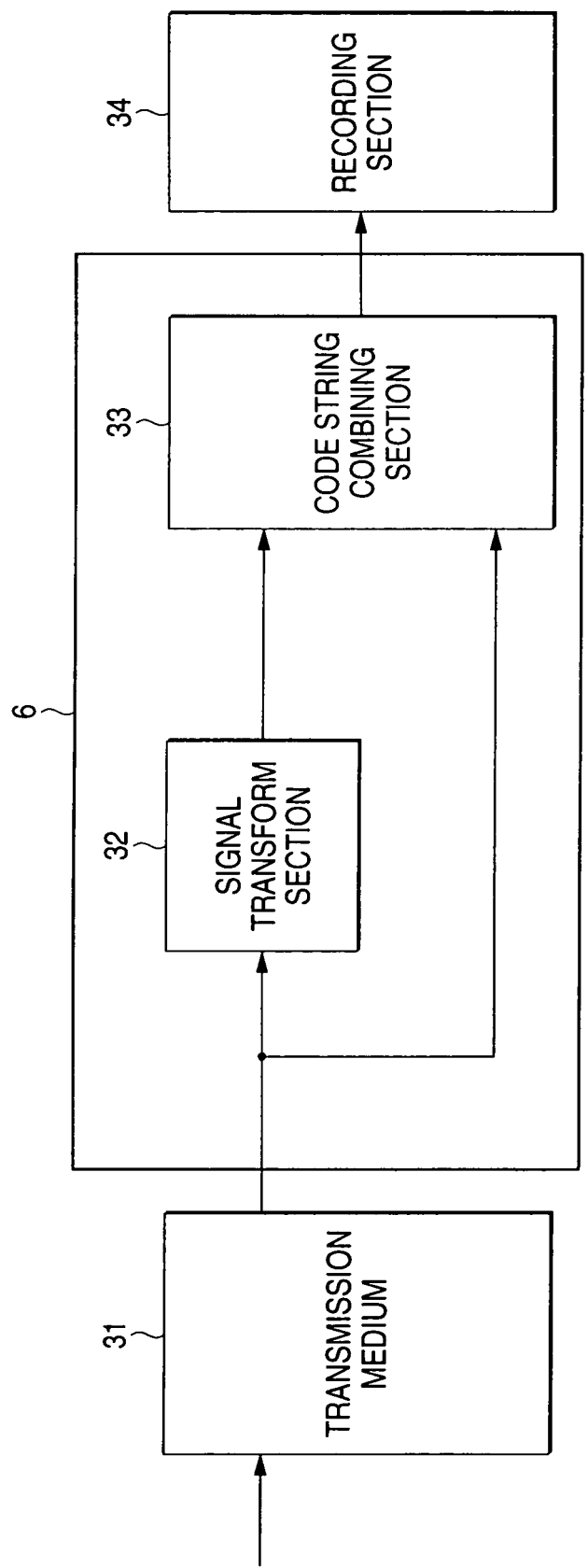
FIG. 6 is a block diagram to show a configuration example of an ATC encoder 6 in FIG. 5.

The information recording and reproducing system of the invention comprises generation means (for example, signal transform section 32 in FIG. 6) for generating second information (for example, signal generated by signal transform section 32 in FIG. 6) from first information which is input (for example, information input to ATC encoder 6 from transmission medium 31 in FIG. 6), combining means (for example, code string combining section 33 in FIG. 6) for combining the second information generated by the generation means with the first input information, and record means (for example, record section 34 in FIG. 6) for recording the information provided by the combining means on a record medium.

In the information recording and reproducing system of the invention, the generation means comprises decoding means (for example, second narrow-band decoding section 92 in FIG. 17) for decoding the first information coded in a first coding system, and coding means (for example, first narrow-band coding section 93 in FIG. 17) for coding the first information decoded by the decoding means in a second coding system.

In the information recording and reproducing system of the invention, the generation means further includes cipher decoding means (for example, cipher decoding section 91 in FIG. 17) for decoding the first information encrypted, and the decoding means further decodes the first information decoded by the cipher decoding means.

Figure 19:
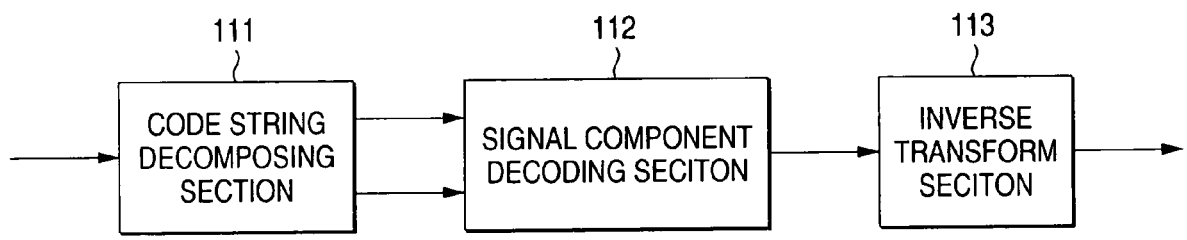
FIG. 19 is a block diagram to show a configuration example of a second narrow-band decoding section 92 in FIG. 17.
Figure 20:
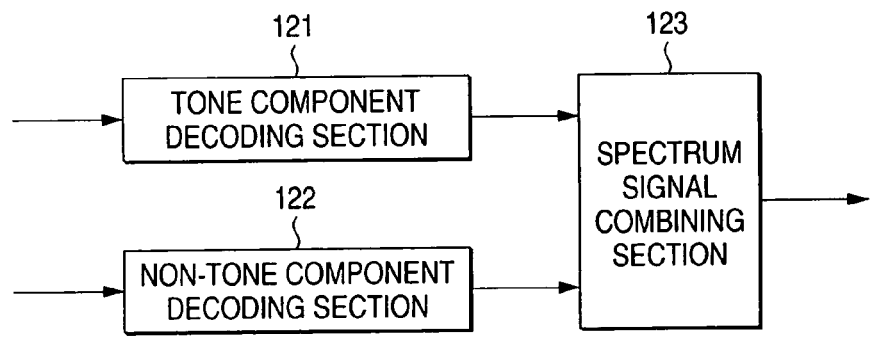
FIG. 20 is a block diagram to show a configuration example of a signal component decoding section 112 in FIG. 19.

In the information recording and reproducing system of the invention, the decoding means further includes separation means (for example, code string decomposing section 111 in FIG. 19) for separating from the first information having a tone component and a non-tone component separated and spectrum components thereof coded, the tone component and the non-tone component, component decoding means (for example, tone component decoding section 121, non-tone component decoding section 122 in FIG. 20) for decoding the tone component and the non-tone component provided by the separation means, and spectrum combining means (for example, spectrum signal combining section 123 in FIG. 20) for combining spectrum components of the tone component and the non-tone component decoded by the component decoding means.

The information recording and reproducing system of the invention further includes transform means (for example, inverse transform section 113 in FIG. 19) for transforming the resultant spectrum component provided by the spectrum combining means into a signal on a time axis.

The information recording and reproducing system of the invention further includes determination means (for example, step S11 in FIG. 30) for determining reproducing which of the first information and the second information recorded on the record medium is specified, billing means (for example, step S13 in FIG. 30) for performing billing processing if it is determined that reproducing the first information is specified, and reproduction means (for example, step S15 in FIG. 30) for reproducing the first information on the record medium.

Figure 31:
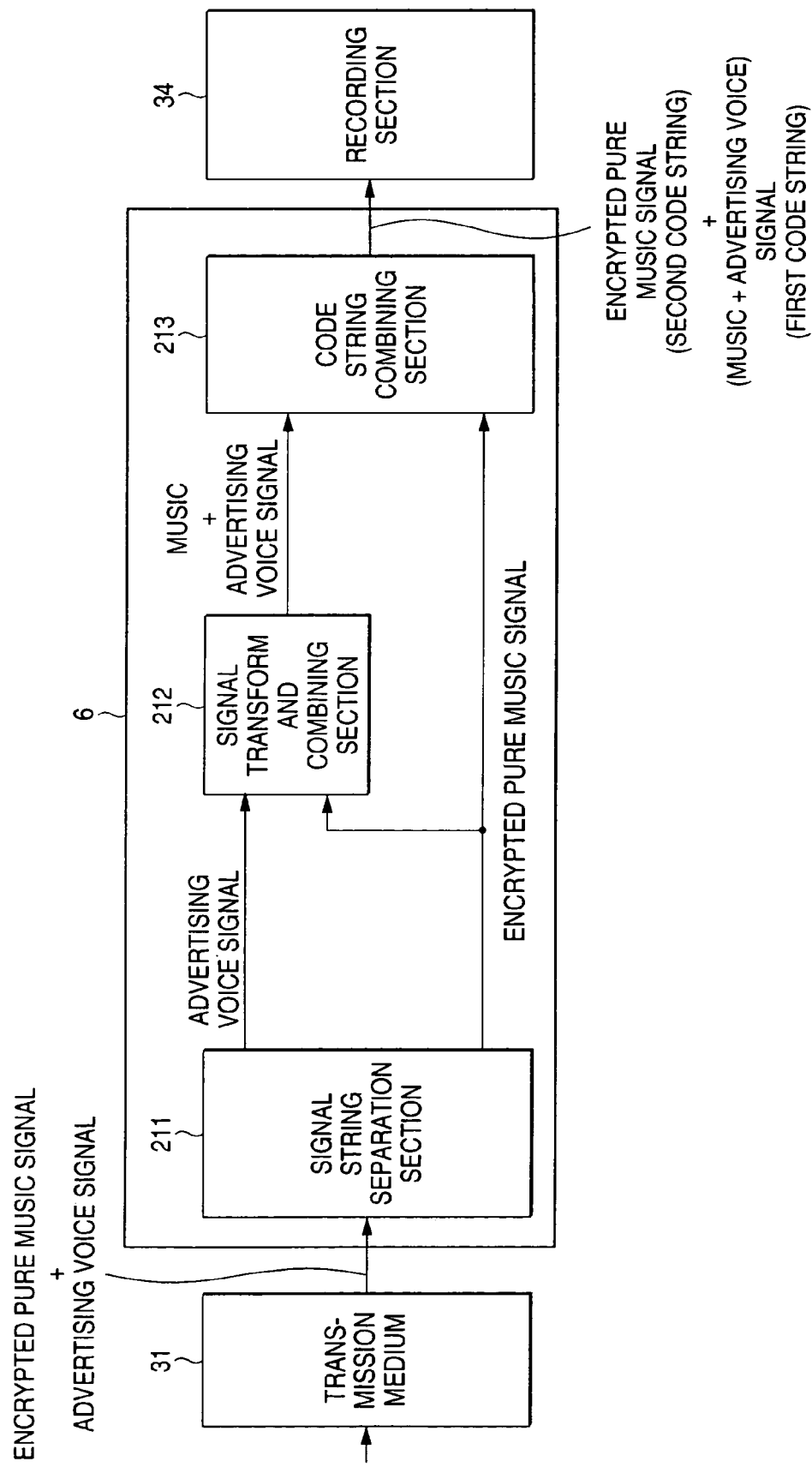
FIG. 31 is a block diagram to show another configuration example of the ATC encoder 6 in FIG. 5.

The information recording and reproducing system of the invention comprises first providing means (for example, signal string separation section 211 in FIG. 31) for providing first information (for example, encrypted pure music signal output from signal string separation section 211 in FIG. 31) coded in a first coding system (for example, ATC2, second providing means (for example, encrypted pure music signal output from signal string separation section 211 in FIG. 31) for providing second information (for example, advertising voice signal output by signal string separation section 211 in FIG. 31), signal transform and combining means (for example, signal transform and combining section in FIG. 31) for coding the first information and the second information provided by the providing means in a second coding system (for example, ATC1), combining means (for example, code string combining section 213 in FIG. 31) for combining the first information and the second information coded by the coding means with the first information which is input, and record means (record section 34 in FIG. 31) for recording the information provided by the combining means on a record medium.

Figure 35:
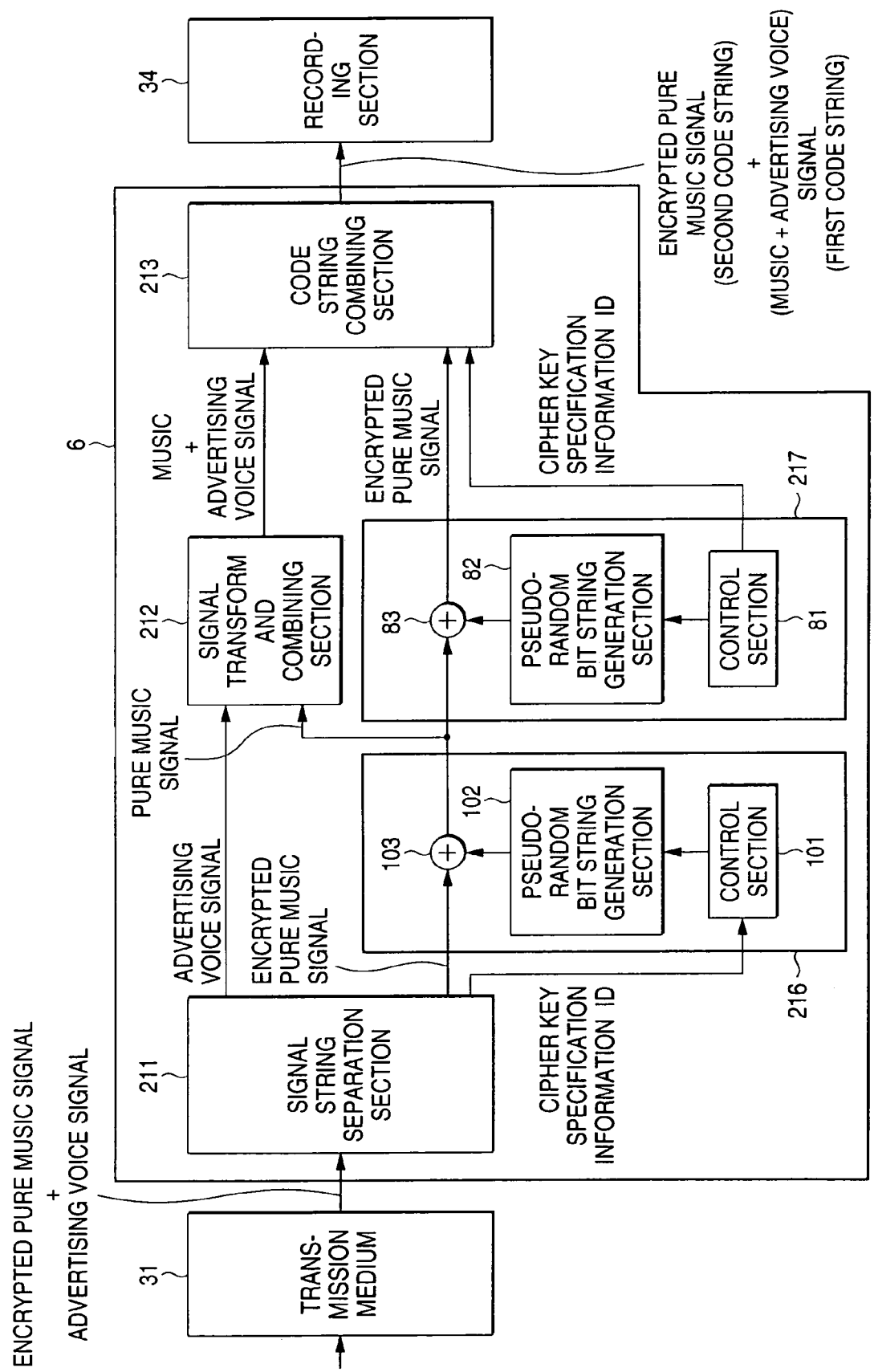
FIG. 35 is a block diagram to show still another configuration example of the ATC encoder 6 in FIG. 5.

The information recording and reproducing system of the invention comprises first providing means (for example, signal string separation section 211 and cipher decoding section 216 in FIG. 35) for providing first information (for example, pure music signal in FIG. 35) coded in a first coding system (for example ATC2), second providing means (for example, signal string separation section 211 in FIG. 35) for providing second information (for example, advertising voice signal in FIG. 35), coding means (for example, first narrow-band coding section 235 in FIG. 36) for coding the first information and the second information in a second coding system (for example, ATC1), encryption means (for example, encryption section 217 in FIG. 35) for encrypting the first information based on cipher key information, combining means (for example, a code string combining section 213 in FIG. 35) for combining the first information and the second information coded by the coding means with the first information encrypted by the encryption means, and record means (for example, record section 34 in FIG. 35) for recording the information provided by the combining means on a record medium.

The information recording and reproducing system of the invention comprises reproduction means (for example, read section 306 in FIG. 40) for reproducing information recorded on the record medium, first decoding means (for example, cipher decoding section 311 in FIG. 41) for decoding first information encrypted (for example, signal of second code string in FIG. 43) from the information reproduced by the reproduction means, transform means for transforming the first information coded in a first coding system (for example, ATC2), decoded by the first decoding means into code in a second coding system (for example, ATC1) as second information (for example, signal of third code string in FIG. 43), and record means (for example, write section 308 in FIG. 40) for recording the second information provided by the transform means on the record means.

The information recording and reproducing system of the invention comprises reproduction means (for example, read section 306 in FIG. 40) for reproducing from the record medium recording first information (for example, first code string in FIG. 43) coded in a first coding system (for example, ATC1) and second information (for example, second code string in FIG. 43) coded in a second coding system (for example, ATC2), the second information, transform means for transforming the second information reproduced by the reproduction means into code in the first coding system as third information (for example, third code string in FIG. 43), and record means (for example, write section 308 in FIG. 40) for recording the third information provided by the transform means on the record means.

Figure 1:
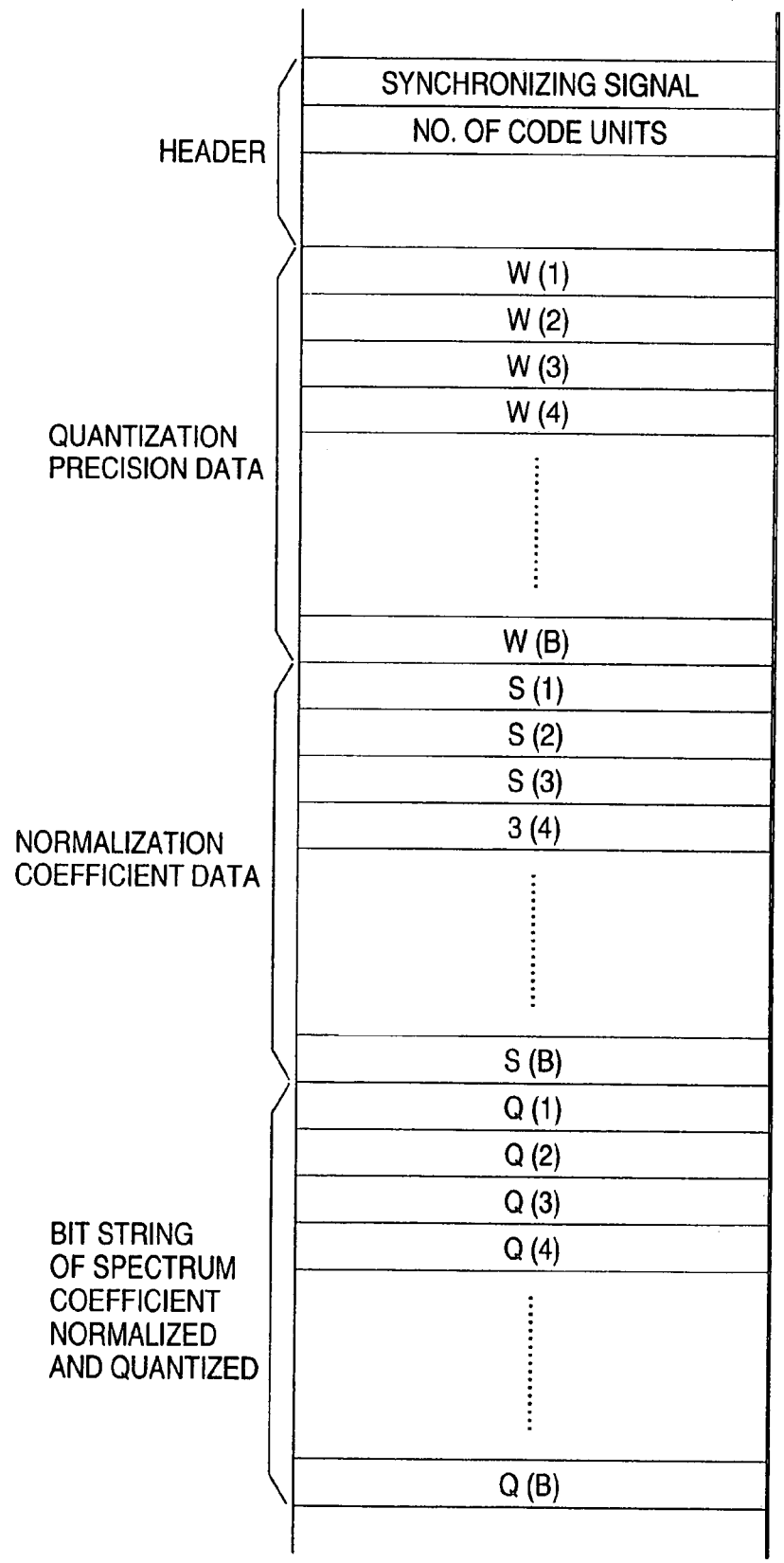
FIG. 1 is a drawing to show an example of code string output in a related art.
Figure 2:
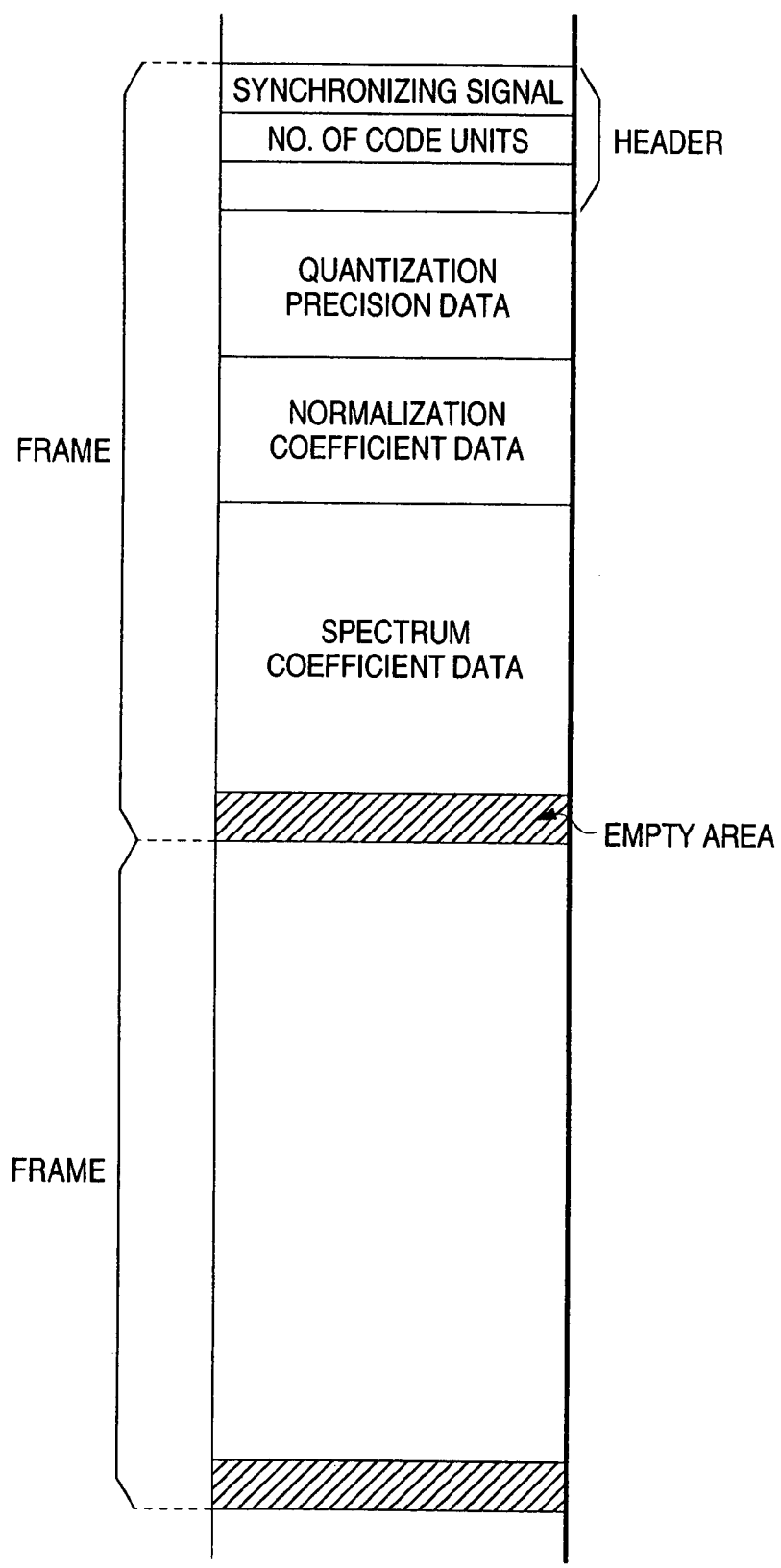
FIG. 2 is a drawing to describe a format for recording the code string in FIG. 1.
Figure 3:
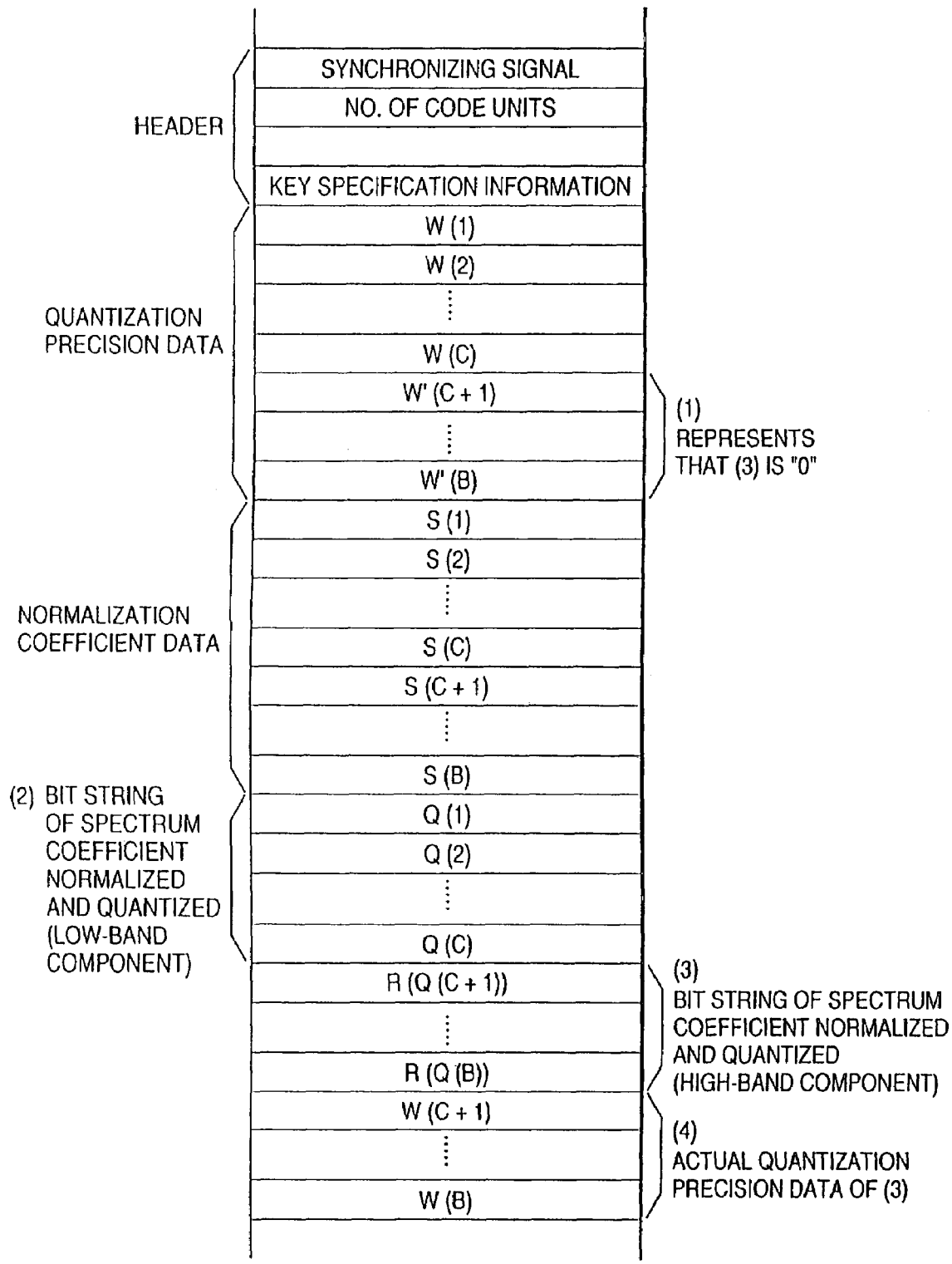
FIG. 3 is a drawing to show another example of code string in the related art.
Figure 4:
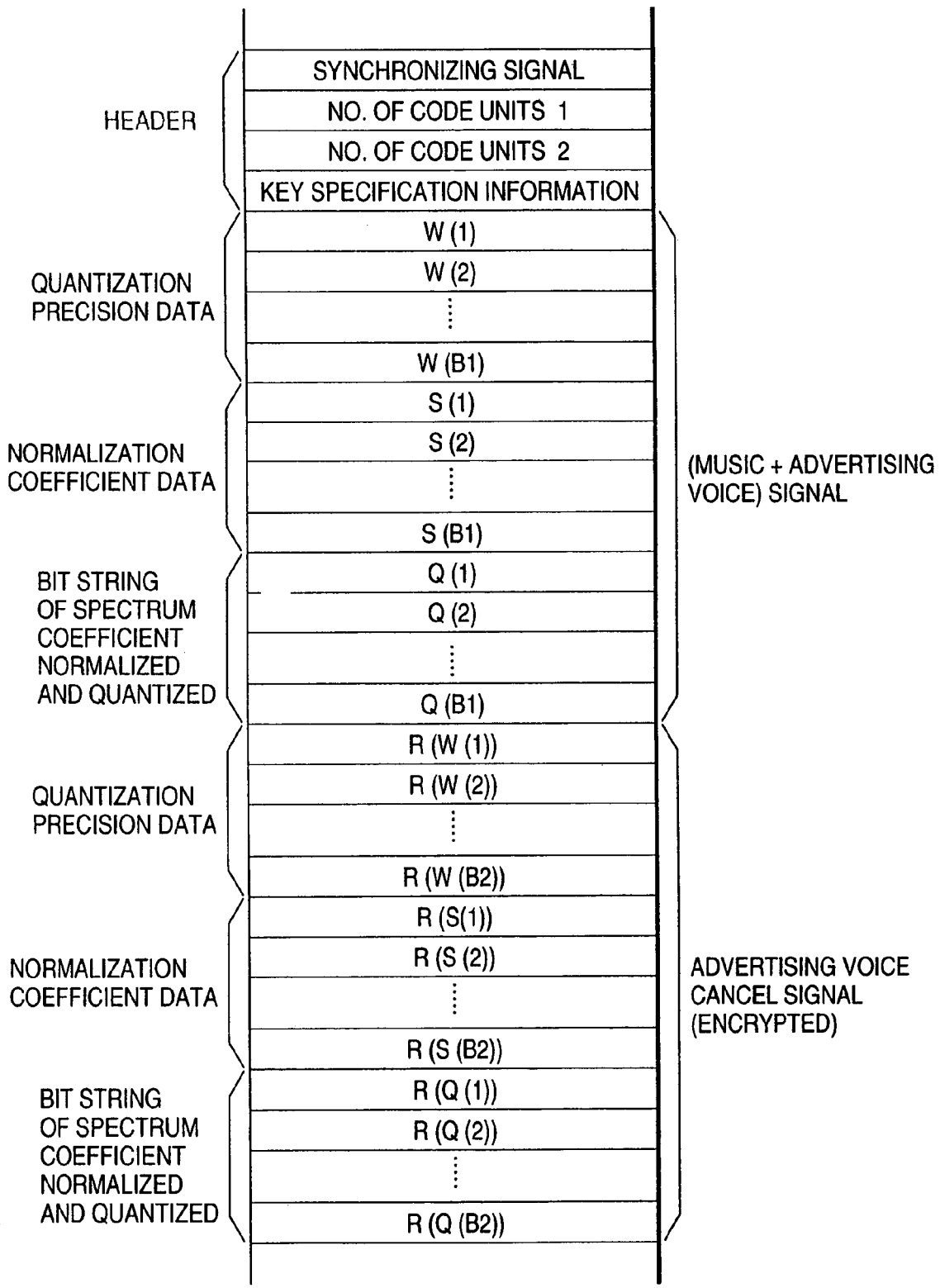
FIG. 4 is a drawing to show still another example of code string in related art.
Figure 5:
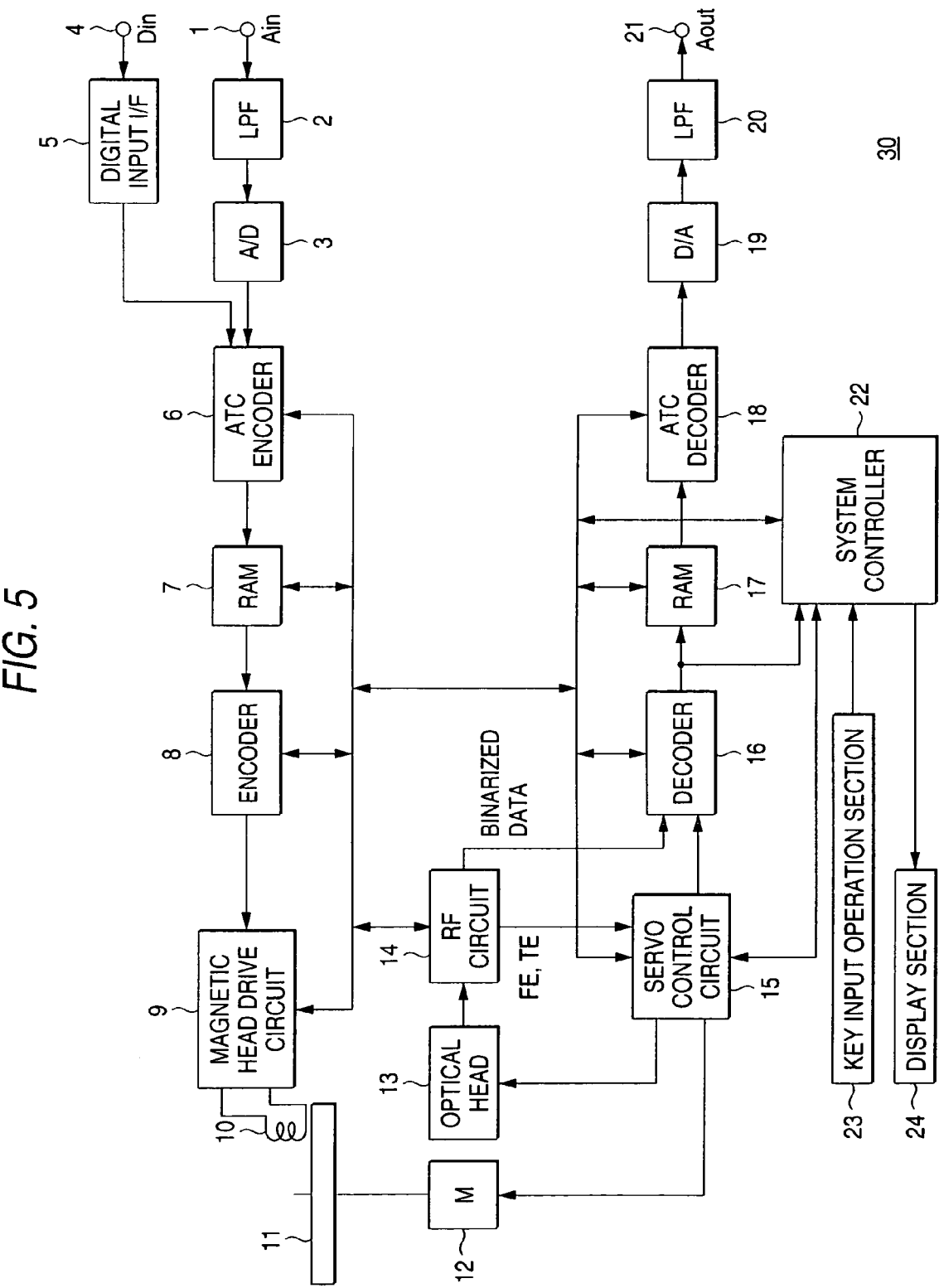
FIG. 5 is a block diagram to show a configuration example of a magneto-disc unit incorporating the invention.

FIG. 5 shows a configuration example of a magneto-optic disc unit 30 incorporating the invention. In the magneto-optic disc unit 30, a magneto-optic disc 11 is rotated by a spindle motor 12.

To record data on the magneto-optic disc 11, for example, a modulation magnetic field responsive to the record data is applied by a magnetic head 10 with laser light applied by an optical head 13, namely, magnetic field-modulation recording is executed, thereby recording the data along a record track of the magneto-optic disc 11. To reproduce data, the record track of the magneto-optic disc 11 is traced with laser light by the optical head 13 for mangetooptically reproducing the data.

The optical head 13 is made up of, for example, a laser light source of a laser diode, etc., optical parts such as a collimator lens, an object lens, a polarization beam splitter, and a cylindrical lens, a photo detector having a light reception section of a predetermined pattern, and the like. The optical head 13 is placed at a position facing the magnetic head 10 with the magneto-optic disc 11 between. When data is recorded on the magneto-optic disc 11, the magnetic head 10 is driven by a magnetic head drive circuit 9 of a recording system described later for applying a modulation magnetic field responsive to the record data to the magneto-optic disc 11 and laser light is applied to the target track of the magneto-optic disc 11 by the optical head 13, whereby thermomagnetic recording is executed by a magnetic field modulation method. The optical head 13 detects reflected light of laser light applied to the target track, detects a focus error, for example, by a so-called astigmatism method, and detects a tracking error by a so-called push-pull method. When data is reproduced from the magneto-optic disc 11, the optical head 13 detects a difference in the polarization angle (Kerr rotation angle) of reflected light of laser light from the target track at the same time as it detects a focus error or a tracking error, and generates a reproduction signal.

Output of the optical head 13 is supplied to an RF circuit 14. The RF circuit 14 extracts a focus error signal or a tracking error signal from the output of the optical head 13 and supplies the extracted error signal to a servo control circuit 15. It also binarizes the reproduction signal and supplies the binarized signal to a decoder 16 of a reproducing system described later.

The servo control circuit 15 is made up of, for example, a focus servo control circuit, a tracking servo control circuit, a spindle motor servo control circuit, a thread servo control circuit, etc. The focus servo control circuit performs focus control of an optical system of the optical head 13 so as to minimize the focus error signal. The tracking servo control circuit performs tracking control of the optical system of the optical head 13 so as to minimize the tracking error signal. The spindle motor servo control circuit controls the spindle motor 12 so as to turn the magneto-optic disc 11 at a predetermined rotation speed (for example, constant linear velocity). The thread servo control circuit moves the optical head 13 and the magnetic head 10 to the target track position of the magneto-optic disc 11 specified by a system controller 22. The servo control circuit 15, which performs such various types of control operation, sends information indicating the operation state of each of the controlled parts to the system controller 22.

A key input operation section 23 and a display section 24 are connected to the system controller 22. The system controller 22 controls the recording system and the reproducing system according to operation input information corresponding to the operation of the key input operation section 23. It also manages the record positions and the reproduction positions on the record track traced by the optical head 13 and the magnetic head 10 based on address information in sector units reproduced based on the header time from the record track of the magneto-optic disc 11, Q data of subcode, etc. Further, the system controller 22 performs control for causing the display section 24 to display the reproduction time based on the data compression rate and reproduction position information on the record track.

To display the reproduction time, the address information (absolute time information) in sector units calculated based on so-called header time, Q data of subcode, etc., reproduced from the record track of the magneto-optic disc 11 is multiplied by the reciprocal of the data compression rate (for example, 4 when data is compressed to ¼), thereby finding actual time information, and the display section 24 is caused to display the actual time information. At the recording-time, for example, when absolute time information is previously recorded (preformatted) on a record track of the magneto-optic disc 11, the preformatted absolute time information is read and is multiplied by the reciprocal of the data compression rate, whereby the current position can also be displayed as the actual record time.

In the recording system of the magneto-optic disc unit 30, an analog audio input signal AIN from an input terminal 1 is supplied through a low-pass filter (LPF) 2 to an A/D (analog-digital) converter 3, which then quantizes the analog audio input signal AIN to generate a digital audio signal, and supplies the generated digital audio signal to an ATC (Adaptive Transform Coding) encoder 6. A digital audio input signal DIN from an input terminal 4 is supplied to the ATC encoder 6 through a digital input interface circuit 5. The ATC encoder 6 compresses (codes) the input signal AIN or DIN at a predetermined data compression rate (bit compression (data compression)) according to ATC such as ATRAC (Adaptive Transform Acoustic Coding) (trademark), which will be hereinafter referred to as ATC1, or ATC2 with higher compression efficiency than ATC1, and the compressed data (ATC data) outputted from ATC encoder 6 is supplied to RAM (random-access memory) 7. For example, if the data compression rate is ⅛, the data transfer rate is reduced to ⅛the data transfer rate (75 sectors/sec) at a standard CD-DA format (music CD format), namely, is reduced to 9.375 sectors/sec.

Data is written into and read from the RAM 7 under the control of the system controller 22 and is used as buffer memory for temporarily storing the ATC data supplied from the ATC encoder 6 and recording the data on the magneto-optic disc 11 as required. That is, for example, if the data compression rate is ⅛, the data transfer rate of the compressed audio data supplied from the ATC encoder 6 is reduced to ⅛the data transfer rate (75 sectors/sec) at the standard CD-DA format, namely, to 9.375 sectors/sec, and the compressed data is written consecutively into the RAM 7. The compressed data (ATC data) may be recorded on one sector as eight-sector data of normal CD music data, as described above.

That is, the recording is performed in burst at the same data transfer rate as the standard CD-DA format (75 sectors/sec) in record units of clusters each consisting of a predetermined number of sectors (for example, 32 sectors+several sectors) with a pause time between. In the RAM 7, the ATC audio data compressed at the data compression rate ⅛and written consecutively at the low transfer rate of 9.375 (=75/8) sectors/sec responsive to the bit compression rate is read in burst at the transfer rate of 75 sectors/sec as record data. For the read and recorded data, the whole data transfer rate containing the recording pause time is the low rate of 9.375 sectors/sec, but the instantaneous data transfer-rate within the time of the recording operation performed in burst is the standard rate of 75 sectors/sec. Therefore, when the disk rotation speed is the same speed as the standard CD-DA format (constant linear velocity), data is recorded at the same recording density as the CD-DA format in the same storage pattern as the CD-DA format.

The ATC audio data read in burst at the (instantaneous) transfer rate of 75 sectors/sec from the RAM 7, namely, the record data is supplied to an encoder 8. The unit in which the data string supplied from the RAM 7 to the encoder 8 is recorded consecutively in one recording is a cluster consisting of sectors (for example, 32 sectors) and several sectors for cluster connection placed before and after the cluster. The reason why the cluster connection sectors are placed is that the interleaved data does not affect any other cluster data by setting the data record area longer than the interleave length in the encoder 8 (32 sectors).

The encoder 8 performs coding processing (parity addition and interleave processing) for error correction, EFM coding processing, etc., for the record data supplied in burst as described above from the RAM 7, and supplies the resultant record data to the magnetic head drive circuit 9, which then drives the magnetic head 10 so as to apply a modulation magnetic field responsive to the record data to the magneto-optic disc 11.

The system controller 22 performs memory control for the RAM 7 as described above and also controls the record positions so as to record the record data read in burst from the RAM 7 by the memory control consecutively onto a record track of the magneto-optic disc 11. To control the record positions, the system controller 22 manages the record positions of the record data read in burst from the RAM 7 and supplies a control signal specifying each record position on the record track of the magneto-optic disc 11 to the servo control circuit 15.

Next, the reproducing system will be discussed. The reproducing system reproduces the record data recorded consecutively on each record track of the magneto-optic disc 11 by the recording system, and comprises a decoder 16. Reproduction output provided by tracing the record track of the magneto-optic disc 11 with laser light by the optical head 13 is binarized by the RF circuit 14 and the binarized data is supplied to the decoder 16. The optical head 13 can read not only the magneto-optic disc 11, but also a playback-only optical disc like a CD (Compact Disc).

The decoder 16, which corresponds to the encoder 8 in the recording system, performs decoding processing, EMF decoding processing, etc., for error correction for the reproduction output binarized by the RF circuit 14 and reproduces the ATC audio data compressed at the data compression rate ⅛at the transfer rate of 75 sectors/sec faster than the normal transfer rate, then supplies the reproduction data obtained from the decoder 16 to RAM 17.

Data is written into and read from the RAM 17 under the control of the system controller 22; the reproduction data supplied at the transfer rate of 75 sectors/sec from the decoder 16 is written into the RAM 17 in burst as it is at the transfer rate of 75 sectors/sec. From the RAM 17, the reproduction data written in burst at the transfer rate of 75 sectors/sec is read consecutively at the transfer rate of 9.375 sectors/sec corresponding to the data compression rate ⅛.

The system controller 22 performs memory control in such a manner that the reproduction data is written into the RAM 17 at the transfer rate of 75 sectors/sec and is read from the RAM 17 consecutively at the transfer rate of 9.375 sectors/sec. The system controller 22 performs memory control for the RAM 17 as described above and also controls the reproduction positions so as to reproduce the reproduction data written into the RAM 17 in burst by the memory control consecutively from the record track of the magneto-optic disc 11. To control the reproduction positions, the system controller 22 manages the reproduction positions of the reproduction data read in burst from the RAM 17 and supplies a control signal specifying each reproduction position on the record track of the magneto-optic disc 11 to the servo control circuit 15.

The ATC audio data provided as the reproduction data read consecutively from the RAM 17 at the transfer rate of 9.375 sectors/sec is supplied to an ATC decoder 18, which corresponds to the ATC encoder 6 in the recording system. The ATC decoder 18 expands the ATC data, for example, eight times (data decompression (bit decompression)) for reproducing 16-bit digital audio data, and supplies the 16-bit digital audio data to a D/A (digital-analog) converter 19.

The D/A converter 19 converts the digital audio data supplied from the ATC decoder 18 into an analog signal to generate an analog audio signal A OUT, and outputs the analog audio signal A OUT from an output terminal 21 through a low-pass filter (LPF) 20.

In the magneto-optic disc unit 30, audio data input through the input terminal 4 from a transmission medium 31 consisting of a telephone line, a network, etc., is encoded by the ATC encoder 6 as shown in FIG. 6, then can be recorded on the magneto-optic disc 11 by a recording section 34 made up of the RAM 7, the encoder 8, the magnetic head drive circuit 9, the magnetic head 10, etc., in FIG. 5. Before a description is given with reference to FIG. 6, a transmission system for transmitting an audio signal to the transmission medium 31 will be discussed with reference to FIG. 7.

In the transmission system, a transform section 41 transforms an audio signal input from a system (not shown) into a spectrum component and outputs the spectrum component to a signal component coding section 42, which then separates the input spectrum component into a tone component and a non-tone component and codes the components in ATC2, then outputs the result to a code string generation section 43.

The code string generation section 43 generates a code string from codes of the tone and non-tone components input from the signal component coding section 42 and outputs the code string to an encryption section 44, which then encrypts the code string input from the code string generation section 43 and transmits the encrypted code string to the transmission medium 31.

Next, the operation of the transmission system will be discussed. The transform section 41 transforms an input signal on the time axis into a spectrum component (signal on the frequency axis) and outputs the spectrum component to the signal component coding section 42, which then separates the input spectrum component into a tone component and a non-tone component and codes the components, then outputs the result to the code string generation section 43. The code string generation section 43 combines the codes of the tone and non-tone components into a code string and outputs the code string to the encryption section 44, which then encrypts the input code string and transmits the encrypted code string to the transmission-medium 31.

Figure 8:
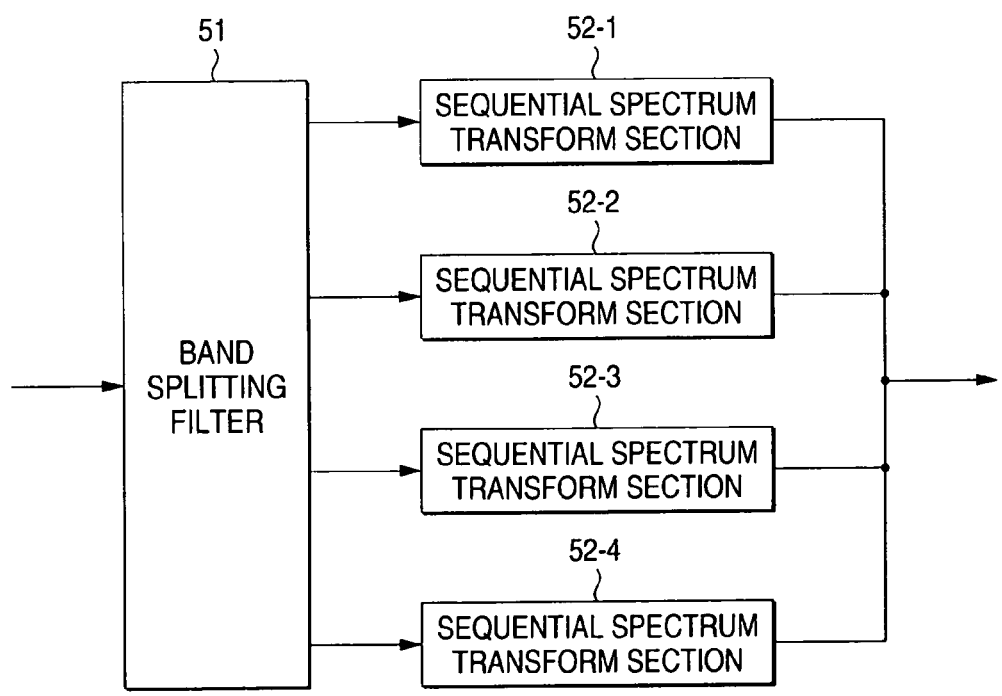
FIG. 8 is a block diagram to show a configuration example of a transform section 41 in FIG. 7.

FIG. 8 shows a configuration example of the transform section 41. In this configuration example, an input signal is split into predetermined frequency bands (in the example, four frequency bands) through a band splitting filter 51 and sequential spectrum transform sections 52-1 to 52-4 transform the signals in the four frequency bands into spectrum components and output the spectrum components to the signal component coding section 42.

Figure 9:
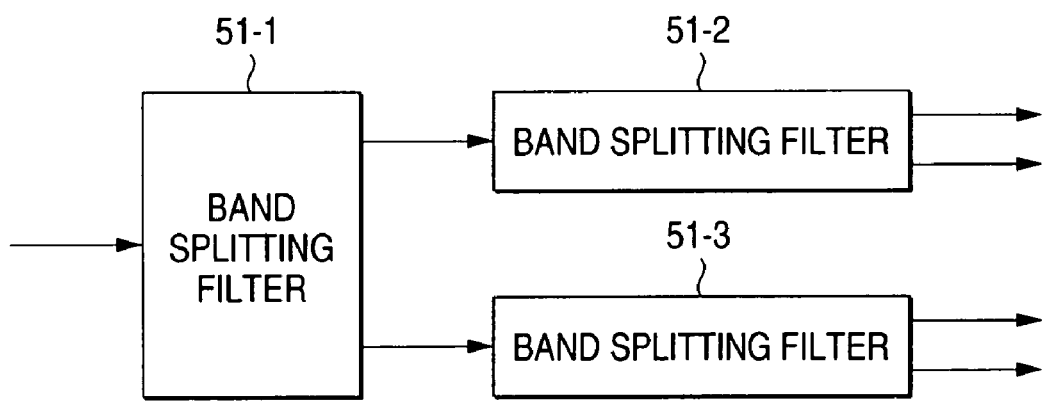
FIG. 9 is a block diagram to show a configuration example of a band splitting filter 51 in FIG. 8.

The band splitting filter 51 can be made up of band splitting filters 51-1 to 51-3, for example, as shown in FIG. 9. In the configuration example, an input signal is split into a signal in a higher frequency band and a signal in a lower frequency band through the band splitting filter 51-1 and the signal in the higher frequency band is furthermore split into a signal at a higher frequency and a signal at a lower frequency through the band splitting filter 51-2. The signal in the lower frequency band output through the band splitting filter 51-1 is split into a signal component at a higher frequency and a signal component at a lower frequency through the band splitting filter 51-3.

Each of the band splitting filters 51-1 to 51-3 in FIG. 9 is made of a QMF (Quadrature Mirror Filter), but can also be made of a PQF (Polyphase Quadrature Filter). In any way, the signal output through the band splitting filter 51-1 or the signal output through the band splitting filter 51-2, 51-3 is a signal resulting from thinning out the signal input to the band splitting filter 51 or the signal input to the band splitting filter 51-1 to a quarter, and it is made possible to provide a high frequency resolution while the capacity of the buffer memory required for spectrum transform processing is suppressed.

Figure 10:
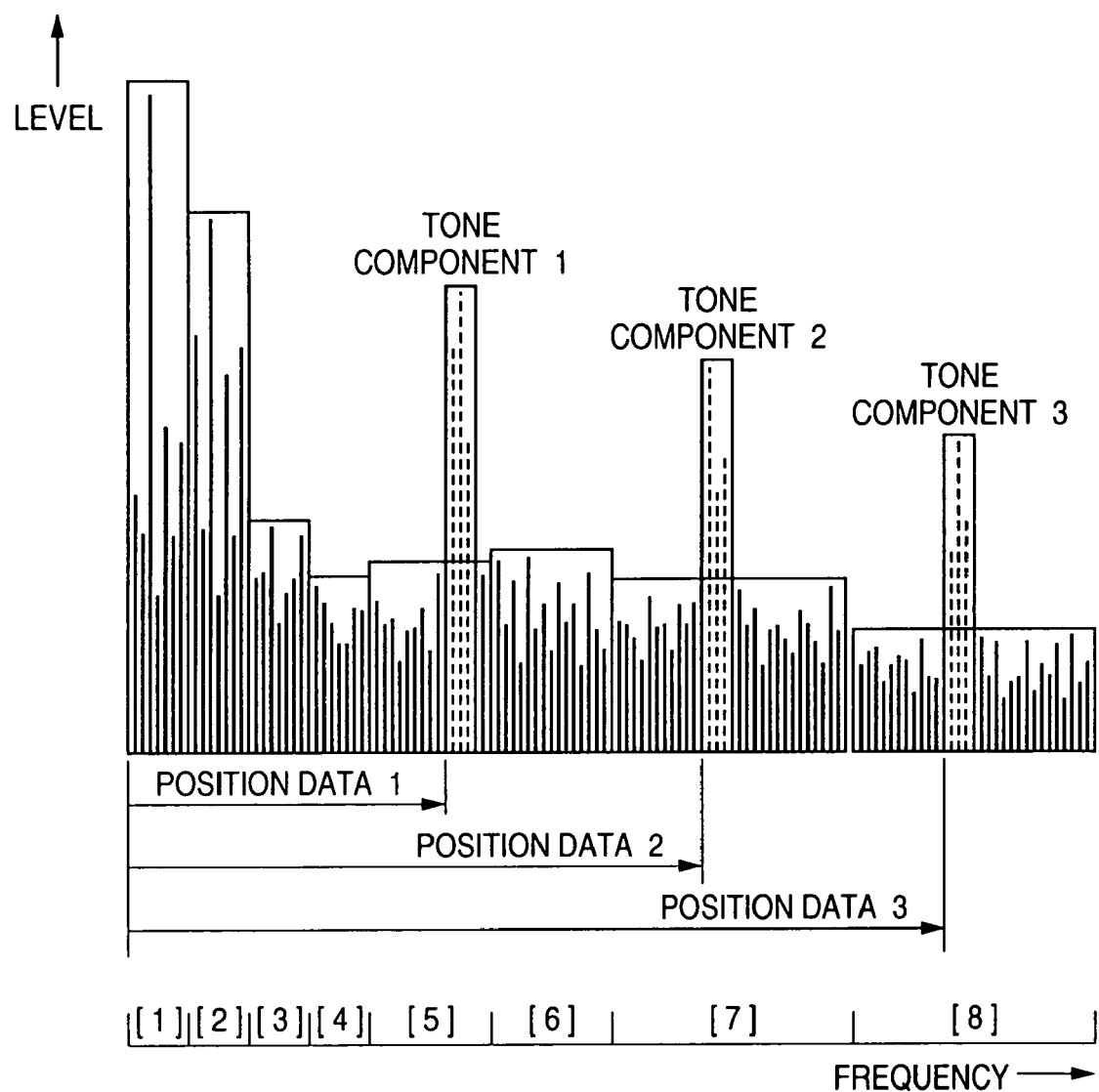
FIG. 10 is a drawing to describe output of the transform section 41 in FIG. 7.

The sequential spectrum transform sections 52-1 to 52-4 output, for example, as shown in FIG. 10. In the figure, the level of the absolute value of the spectrum in MDCT is shown in terms of decibel on the vertical axis. The input signal is transformed into 64 spectrum signals for each predetermined time block.

Figure 7:
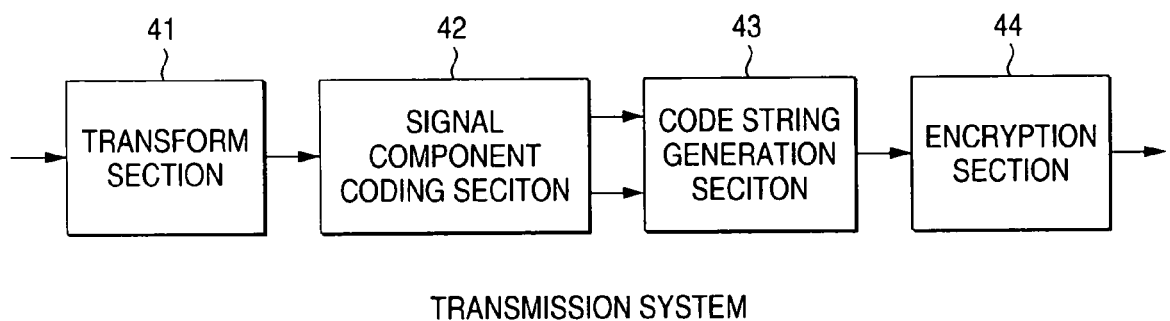
FIG. 7 is a block diagram to show a configuration example of a transmission system for transmitting a signal to a transmission medium 31 in FIG. 6.
Figure 11:
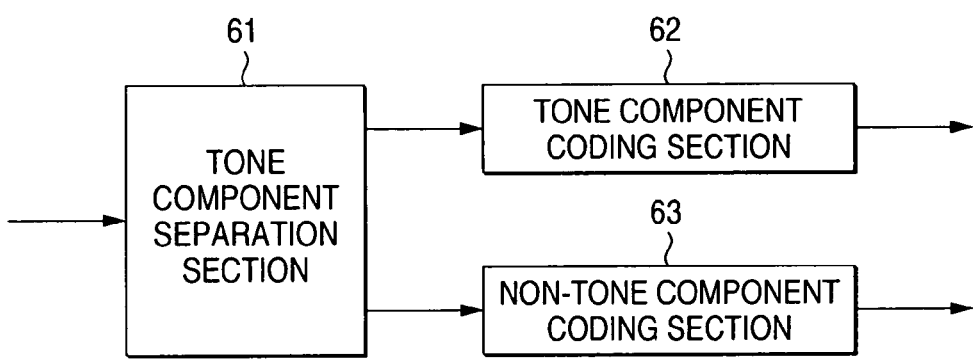
FIG. 11 is a block diagram to show a configuration example of a signal component coding section 42 in FIG. 7.

The signal component coding section 42 in FIG. 7 is made up of components, for example, as shown in FIG. 11. In this configuration example, a tone component separation section 61 separates a sequential spectrum component input from the transform section 41 into a tone component and a non-tone component and outputs the tone component to a tone component coding section 62, which then codes the tone component. On the other hand, the tone component separation section 61 outputs the non-tone component to a non-tone component coding section 63, which then codes the non-tone component.

FIG. 10 shows how three tone components (tone components 1 to 3) are separated. The tone components are coded together with position data on the frequency axis (position data 1 to position data 3).

Generally, to prevent the sound quality from being degraded, the tone signal component as a signal component with energy concentrating on a small number of spectra needs to be quantized with very high precision as compared with other spectrum components (non-tone components). The spectrum coefficient in each code unit after tone components are separated is quantized in a comparatively small number of steps without degrading the sound quality on the auditory sense, whereby the audio signal can be coded efficiently at a high compression rate scarcely causing degradation on the auditory sense.

FIG. 10 shows only a comparatively small number of spectra for simplicity; however, in the actual tone signal, energy concentrates on several spectrum coefficients in the code unit consisting of several ten spectra, thus an increase in the data amount caused by separating such tone components is comparatively small and the coding efficiency can be improved as a whole by separating the tone components.

As the frequency resolution is high, energy concentrates on a specific spectrum signal accordingly, so that the tone component separating method becomes more effective.

As shown in FIG. 10, the input signal is transformed into 64 spectrum signals for each predetermined time block and each spectrum signal-is-normalized and quantized every eight bands 1 to 8 (code units). The quantization precision is changed for each code unit depending on how frequency components distribute, whereby degradation of the sound quality can be minimized and efficient coding as the auditory sense is enabled.

Figure 12:
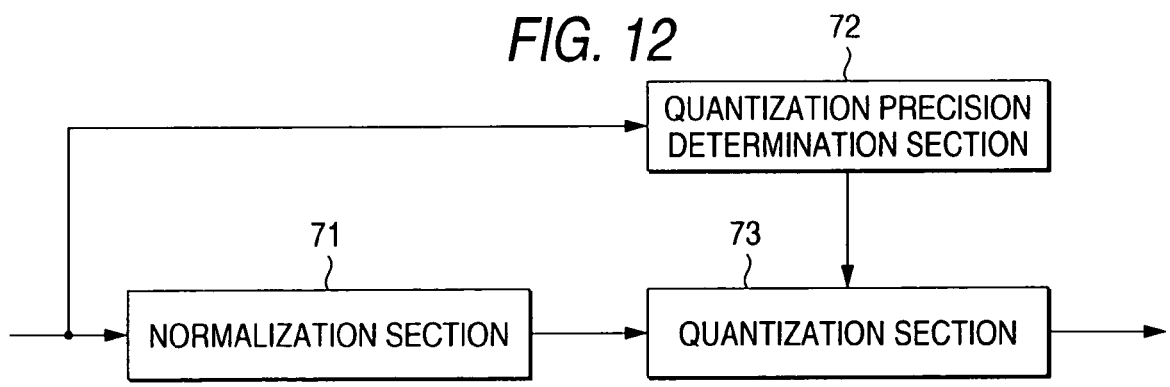
FIG. 12 is a block diagram to show a configuration example of a tone component coding section 62 in FIG. 11.

The tone component coding section 62 (like the non-tone component coding section 63) is made up of components, for example, as shown in FIG. 12. The tone component output from the tone component separation section 61 is input to a normalization section 71 and a quantization precision determination section 72. The normalization section 71 normalizes each level for each band (code unit) based on the maximum value in the band and outputs the result to a quantization section 73. The quantization precision determination section 72 determines the quantization precision in the input band (code unit) and outputs the determined quantization precision to the quantization section 73, which then quantizes the normalized signal level input from the normalization section 71 corresponding to the quantization precision input from the quantization precision determination section 72. The quantization section 73 outputs normalization coefficient information and quantization precision information as well as the quantized signal component to the code string generation section 43 at the following stage.

Figure 13:
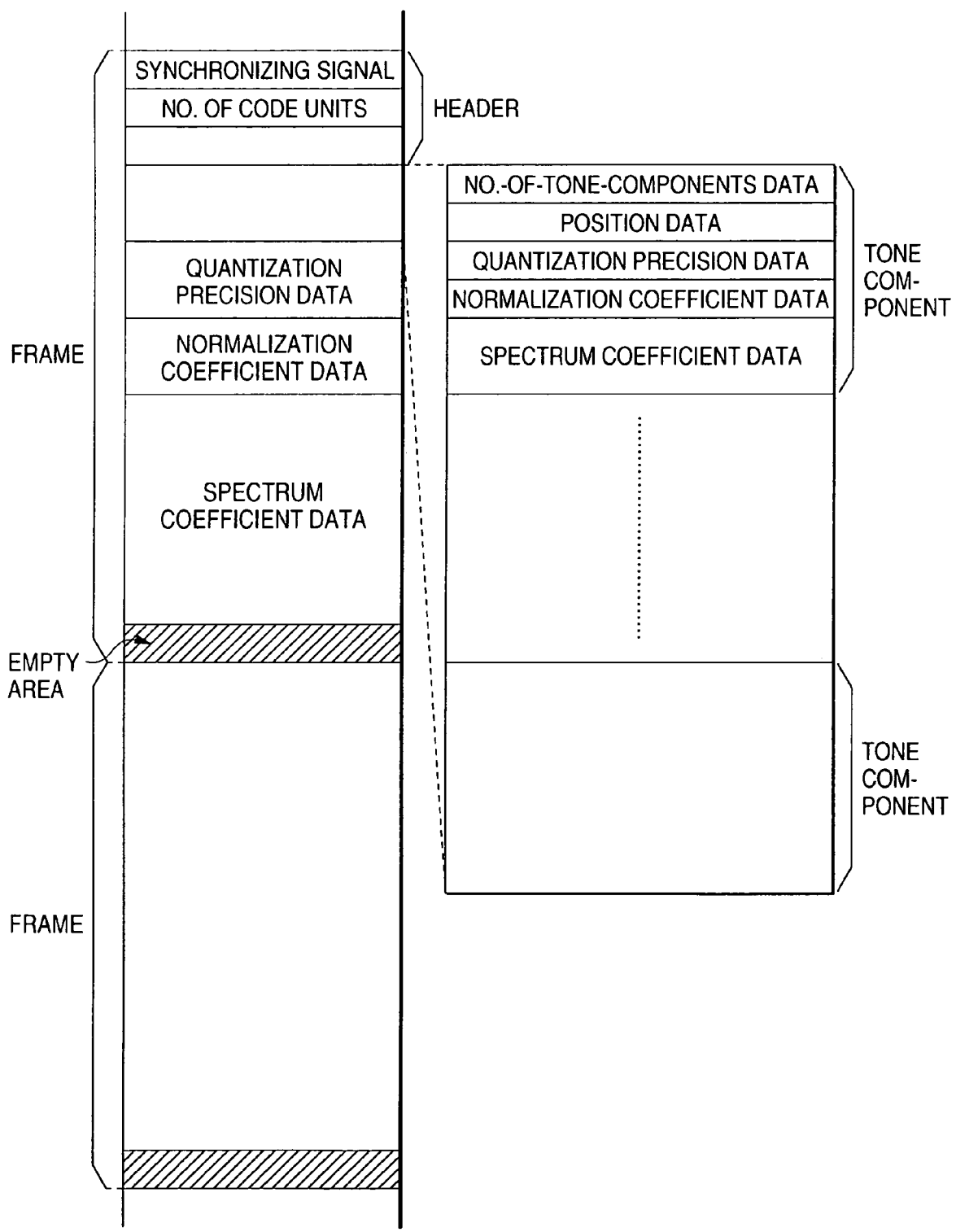
FIG. 13 is a drawing to describe output of a code string generation section 43 in FIG. 7.

The code string generation section 43 in FIG. 7 formats the generated code-string to carry the code string-on the transmission medium 31 as shown in FIG. 13 in transmission units of frames each consisting of a predetermined number of bytes. The actual number of bytes used for coding for each frame is determined by the number of code units and the quantization precision data. If the actual number of bytes used is less than the number of bytes allocated to each frame, an empty area occurs at the end of each frame. For example, byte data taking a value of 0 can be recorded in the empty area as dummy data. To improve the sound quality, the dummy data is lessened, but the empty area can also be intentionally reserved by adjusting the quantization precision data. If the number of quantization bits is contained in the code string as the quantization precision information and each spectrum signal is quantized in the number of quantization bits, the total number of bits required for each frame can be easily calculated and therefore it is also made possible to easily calculate the size of the empty area.

A comparatively short code length is assigned to the quantized spectrum signal with high frequency and a comparatively long code length is assigned to the quantized spectrum signal with low frequency, whereby the coding efficiency can be enhanced. By making the transform block length long, the amount of subinformation such as the quantization precision information and the normalization coefficient information can be reduced relatively and further the frequency resolution can be raised, thus it is made possible to control the quantization precision more finely on the frequency axis and the coding efficiency can be enhanced.

In the example in FIG. 13, a header is placed at the top of each frame and a synchronizing signal and the number of code units contained in the frame are described in the header.

The header is followed by tone components. The tone components are made up of number-of-tone-components data and data of the tone components. The data of each tone component consists of position data indicating the position of the tone component, quantization precision data, normalization coefficient data, and spectrum coefficient data.

The tone component data is followed by quantization precision data, normalization coefficient data, and spectrum coefficient data of non-tone component.

Figures 14, 15:
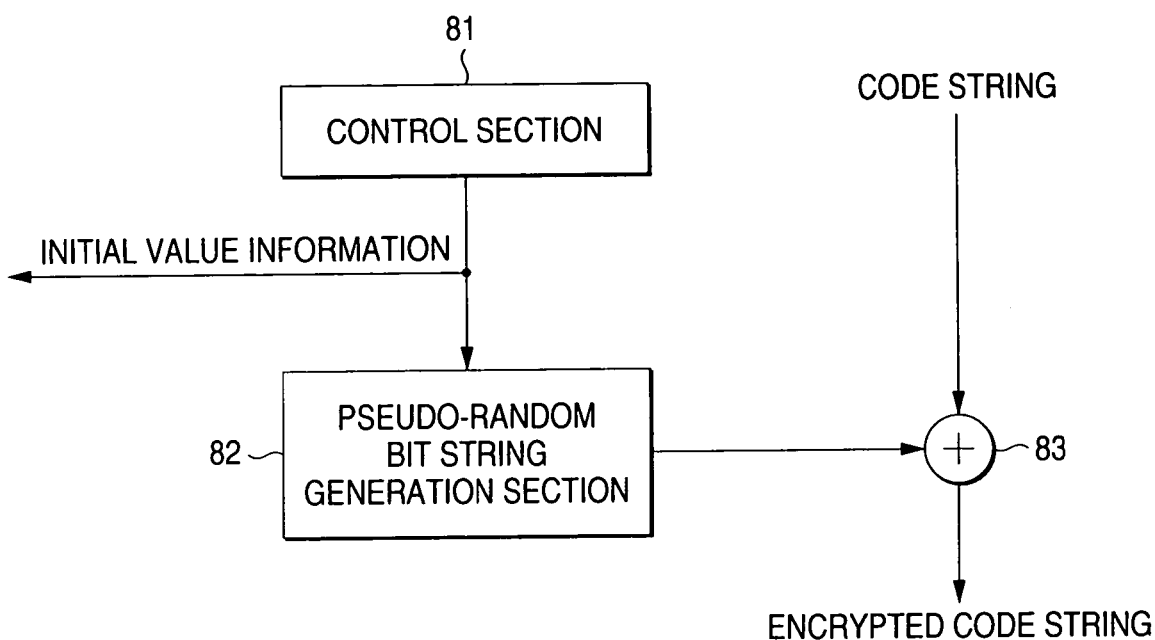
FIG. 14 is a block diagram to show a configuration example of an encryption section 44 in FIG. 7.
FIG. 15 is a drawing to describe processing of an exclusive-OR circuit 83 in FIG. 14.

The encryption section 44 in FIG. 7 is made up of components, for example, as shown in FIG. 14. In the configuration example, a control section 81 generates initial value information required for generating a pseudo-random bit string and outputs the initial value information to a pseudo-random bit string generation section 82, which then selects as a pseudo-random bit string the fiftieth bit from the bottom of a random number sequence provided by repeating a predetermined number of times a process of squaring a 100 bit initial value, for example, and leaving only the 100 bits on the center, and outputs the selected bit to an exclusive-OR circuit 83. The exclusive-OR circuit 83 exclusive-ORs the code string input from the code string generation section 43 (FIG. 7) and the pseudo-random bit string input from the pseudo-random bit string generation section 82, and outputs the operation result.

FIG. 15 represents the encryption principle by processing performed in the exclusive-OR circuit 83. As shown here, when the code string input from the code string generation section 43 (code string A in FIG. 15) and the pseudo-random bit string input from the pseudo-random bit string generation section 82 (bit string B in FIG. 15) are exclusive-ORed, a code string (code string shown as A+B in FIG. 15) different from the original code string (code string A in FIG. 15) is provided as an encrypted code string.

As shown in FIG. 15, if the code string output from the exclusive-OR circuit 83 (code string as A+B in FIG. 15) and the pseudo-random bit string (bit string B in FIG. 15) are furthermore exclusive-ORed, the operation result, namely, code string (code string shown as A+B+B in FIG. 15) becomes the same as the original code string (code string A in FIG. 15). That is, the encrypted code string can be decoded.

Thus, a wide-band music signal coded in ATC2, for example, is supplied from the transmission system in FIG. 7 through the transmission medium 31 in FIG. 6 to the magneto-optic disc unit 30. In the magneto-optic disc unit 30, a signal transform section 32 of the ATC encoder 6 generates a narrow-band music signal coded in ATC1 from the wide-band music signal coded in ATC2 input through the transmission medium 31, and outputs the generated narrow-band music signal to a code string combining section 33, which then combines the wide-band, encrypted music signal input through the transmission medium 31 and the narrow-band music signal coded in ATC1 and not encrypted input from the signal transform section 32, and supplies the resultant code string to the recording section 34, which then records the code string output from the code string combining section 33 on the magneto-optic disc 11.

Figure 16:
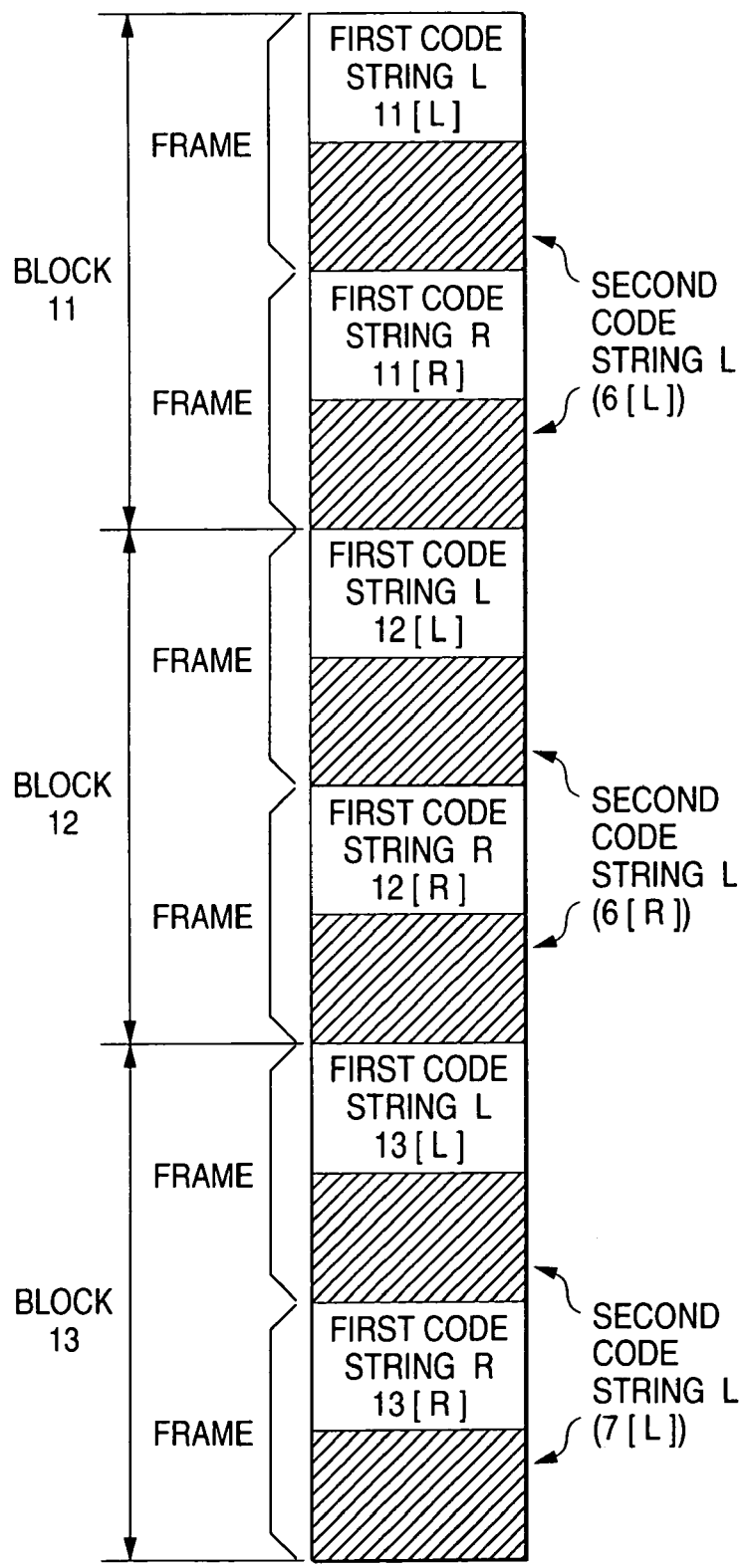
FIG. 16 is a drawing to describe output of a code string combining section 33 in FIG. 6.

FIG. 16 shows the format in which the code string is thus recorded on the magneto-optic disc 11. In the figure, the code string shown as second code string is the code string of the encrypted wide-band music signal supplied from the transmission medium 31 directly to the code string combining section 33 in FIG. 6 and the code string shown as first code string is the code string of the unencrypted narrow-band music signal coded in ATC1 generated by the signal transform section 32 in FIG. 6 from the code string (second code string) supplied through the transmission medium 31.

The data of the second code string is subjected to spectrum transform in the block length twice than in ATC1 and is coded in ATC2 with a higher compression rate. Therefore, in the example, as the first code string, an audio signal of the left channel or an audio signal of the right channel is placed in each frame; as the second code string, a code string of the left channel is placed in two frames and a code string of the right channel is also placed in two frames.

Figure 17:
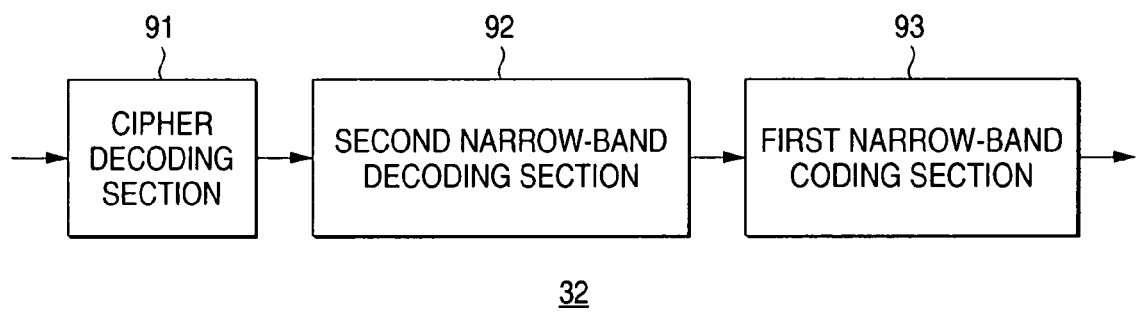
FIG. 17 is a block diagram to show a configuration example of a signal transform section 32 in FIG. 6.

The signal transform section 32 in FIG. 6 is made up of components, for example, as shown in FIG. 17. In the configuration example, the code string of the wide-band music signal encrypted and coded in ATC2 input through the transmission medium 31 (second code string in FIG. 16) is decoded and is supplied to a second narrow-band decoding section 92, which then decodes the input code string of the wide-band music signal coded in ATC2 in a narrow band in ATC2 (only low-frequency component) and outputs the result to a first narrow-band coding section 93. The first narrow-band coding section 93 codes the input music signal in ATC1 and outputs the resultant narrow-band code string (first code string in FIG. 16) to the code string combining section 33 in FIG. 6.

Figure 18:
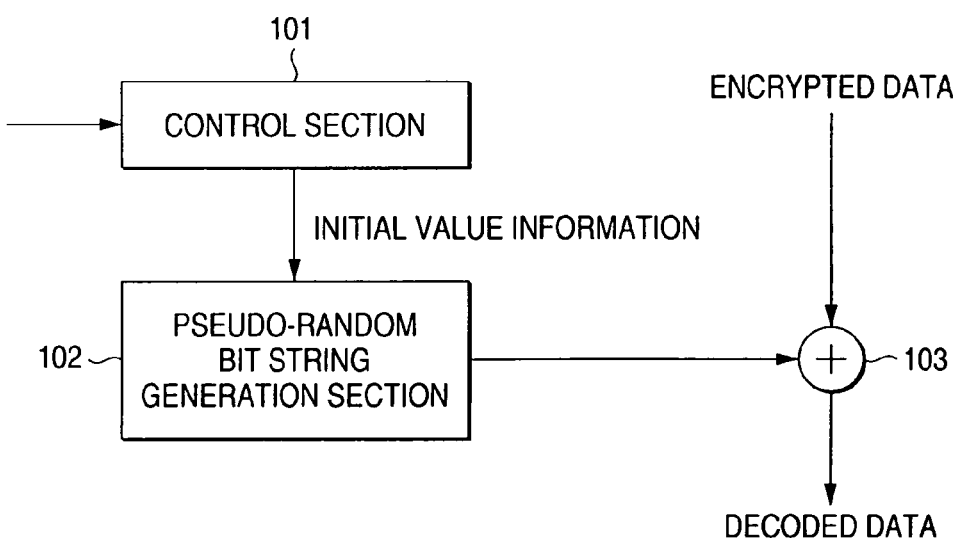
FIG. 18 is a block diagram to show a configuration example of a cipher decoding section 91 in FIG. 17.

A cipher decoding section 91 is made up of components, for example, as shown in FIG. 18. As shown here, when a control section 101 reads initial value information output by the control section 81 in FIG. 14, it outputs the initial value information to a pseudo-random bit string generation section 102, which then generates a pseudo-random bit string corresponding to the input initial value information and supplies the generated pseudo-random bit string to an exclusive-OR circuit 103. The exclusive-OR circuit 103 exclusive-ORs the pseudo-random bit string and encrypted data transmitted through the transmission medium 31. As previously described with reference to FIG. 15, the encrypted data is exclusive-ORed with the pseudo-random bit string used for the encryption, whereby the encrypted data can be decoded. This decoded data is supplied to the second narrow-band decoding section 92 in FIG. 17.

The second narrow-band decoding section 92 is made up of components, for example, as shown in FIG. 19. In the configuration example, a code string decomposing section 111 decomposes the code string decoded by the cipher decoding section 91 into a code string of a tone component and a code string of a non-tone component.

A signal component decoding section 112 is made up of components, for example, as shown in FIG. 20. The tone component input from the code string decomposing section 111 is input to a tone component decoding section 121 and the non-tone component is input to a non-tone component decoding section 122. The tone component decoding section 121 decodes the input tone component in ATC2 and outputs the decoding result to a spectrum signal combining section 123. The non-tone component decoding section 122 also decodes the input non-tone component in ATC2 and outputs the decoding result to the spectrum signal combining section 123. The spectrum signal combining section 123 combines the decoding result of the input tone component and the decoding result of the input non-tone component into a spectrum signal and outputs the spectrum signal to an inverse transform section 113 in FIG. 19.

Figure 21:
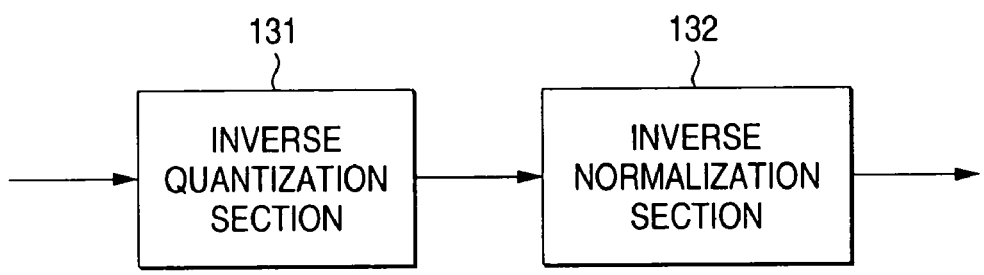
FIG. 21 is a block diagram to show a configuration example of a tone component decoding section 121 in FIG. 20.

The tone component decoding section 121 in FIG. 20 is made up of components as shown in FIG. 21. That is, an inverse quantization section 131 inversely quantizes the tone component input from the code string decomposing section 111 and outputs the result to an inverse normalization section 132, which then performs processing inverse to the processing of the normalization section 71 in FIG. 12, thereby performing inverse normalization processing, and outputs the spectrum component of the original-level tone component.

Although not shown, the non-tone component decoding section 122 is also made up of an inverse quantization section and an inverse normalization section like the tone component decoding section 121 shown in FIG. 21 and performs similar processing, then outputs the spectrum component of non-tone component.

Figure 22:
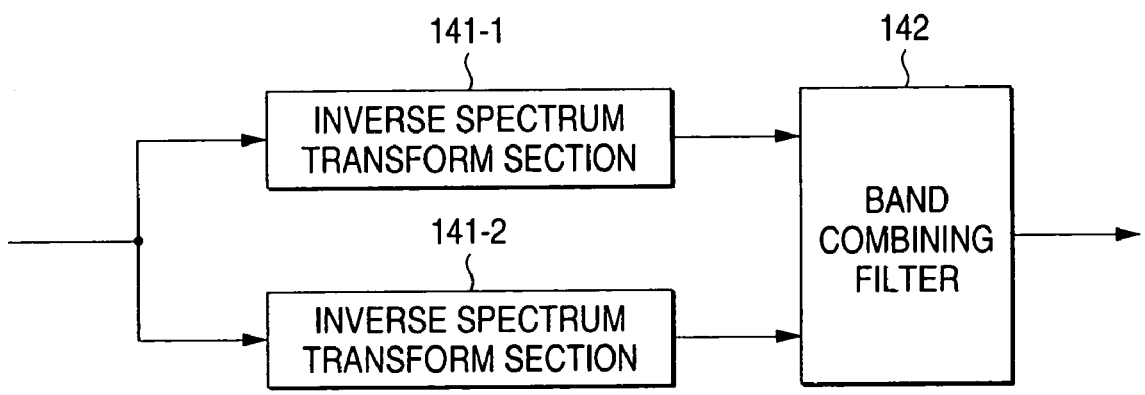
FIG. 22 is a block diagram to show a configuration example of an inverse transform section 113 in FIG. 19.

The inverse transform section 113 in FIG. 19 is made up of components, for example, as shown in FIG. 22. That is, the spectrum signal output from the spectrum signal combining section 123 of the signal component decoding section 112 is input to inverse spectrum transform sections 141-1 and 141-2, which then perform inverse spectrum transform processing for the input spectrum signal for each frequency band, namely, perform processing inverse to the processing of the sequential spectrum transform sections 52-3 and 52-4 in FIG. 8 (because of narrow-band processing, only those of the sequential spectrum transform sections 52-1 to 52-4 corresponding to the low band exist). Then, the inverse spectrum transform sections 141-1 and 141-2 output signals to a band combining filter 142, which then combines the signals as signal on the time axis.

Figure 23:
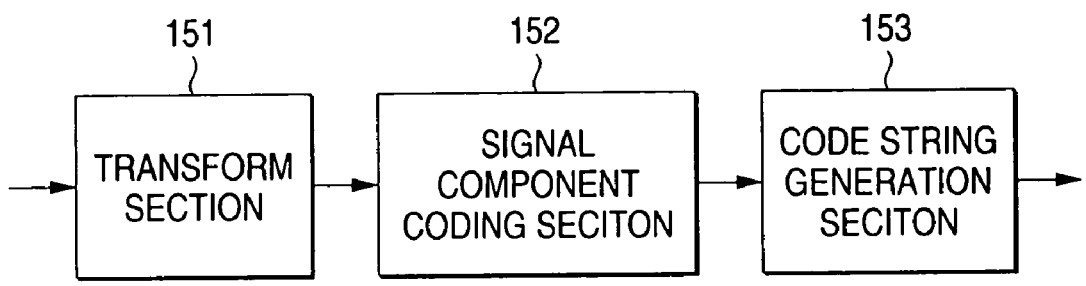
FIG. 23 is a block diagram to show a configuration example of a first narrow-band coding section 93 in FIG. 17.

The first narrow-band coding section 93 in FIG. 17 is made up of components as shown in FIG. 23. In the configuration example, a transform section 151 transforms the narrow-band voice signal output from the second narrow-band decoding section 92 into a sequential spectrum component and outputs the spectrum component to a signal component coding section 152, which then normalizes the spectrum component, then quantizes the normalization result. A code string generation section 153 generates a code string from the code quantized by the signal component coding section 152 and outputs the generated code string to the code string combining section 33 in FIG. 6.

Figure 24:
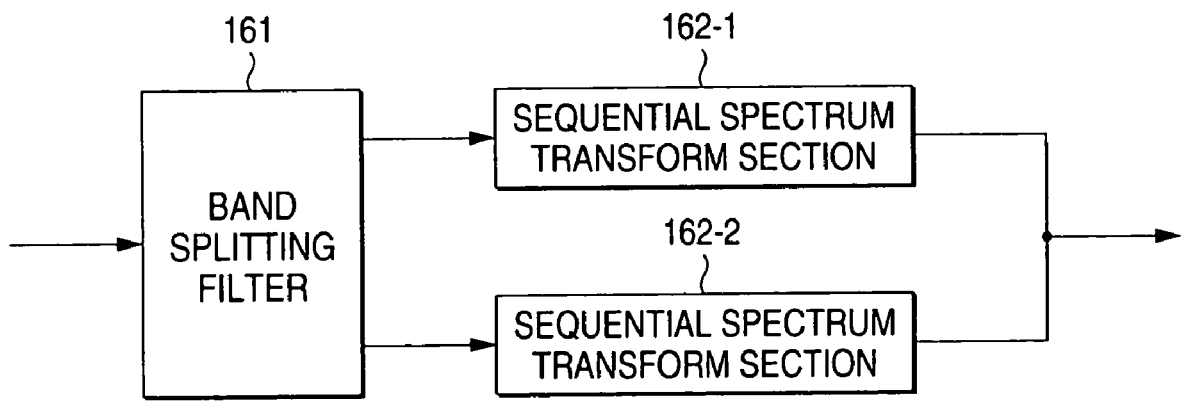
FIG. 24 is a block diagram to show a configuration example of a transform section 151 in FIG. 23.

The transform section 151, the signal component coding section 152, and the code string generation section 153 in FIG. 23 basically perform similar processing to that of the transform section 41, the signal component coding section 42, and the code string generation section 43 in FIG. 7. However, to perform processing in narrower band than that in the transmission system in FIG. 7, the transform section 151 consists of a band splitting filter 161 and sequential spectrum transform sections 162-1 and 162-2 as shown in FIG. 24. The sequential spectrum transform sections 162-1 and 162-2 correspond to the sequential spectrum transform sections 52-3 and 52-4 for processing lower-band components in FIG. 8. The signal component coding section 152, which handles all spectrum components as non-tone components, is not provided with a signal component coding section as shown in FIG. 11 and consists of a normalization section 71, a quantization precision determination section 72, and a quantization section 73 as shown in FIG. 12 for performing coding processing in ATC1.

Thus, the code string combining section 33 in FIG. 6 combines the narrow-band code string coded in ATC1 input from the signal transform section 32 and the encrypted code string coded in ATC2 supplied through the transmission medium 31 and supplies the combining result to the recording section 34, which then records the data on the magneto-optic disc 11, whereby the data as shown in FIG. 16 is recorded on the magneto-optic disc 11 as described above.

Figure 25:
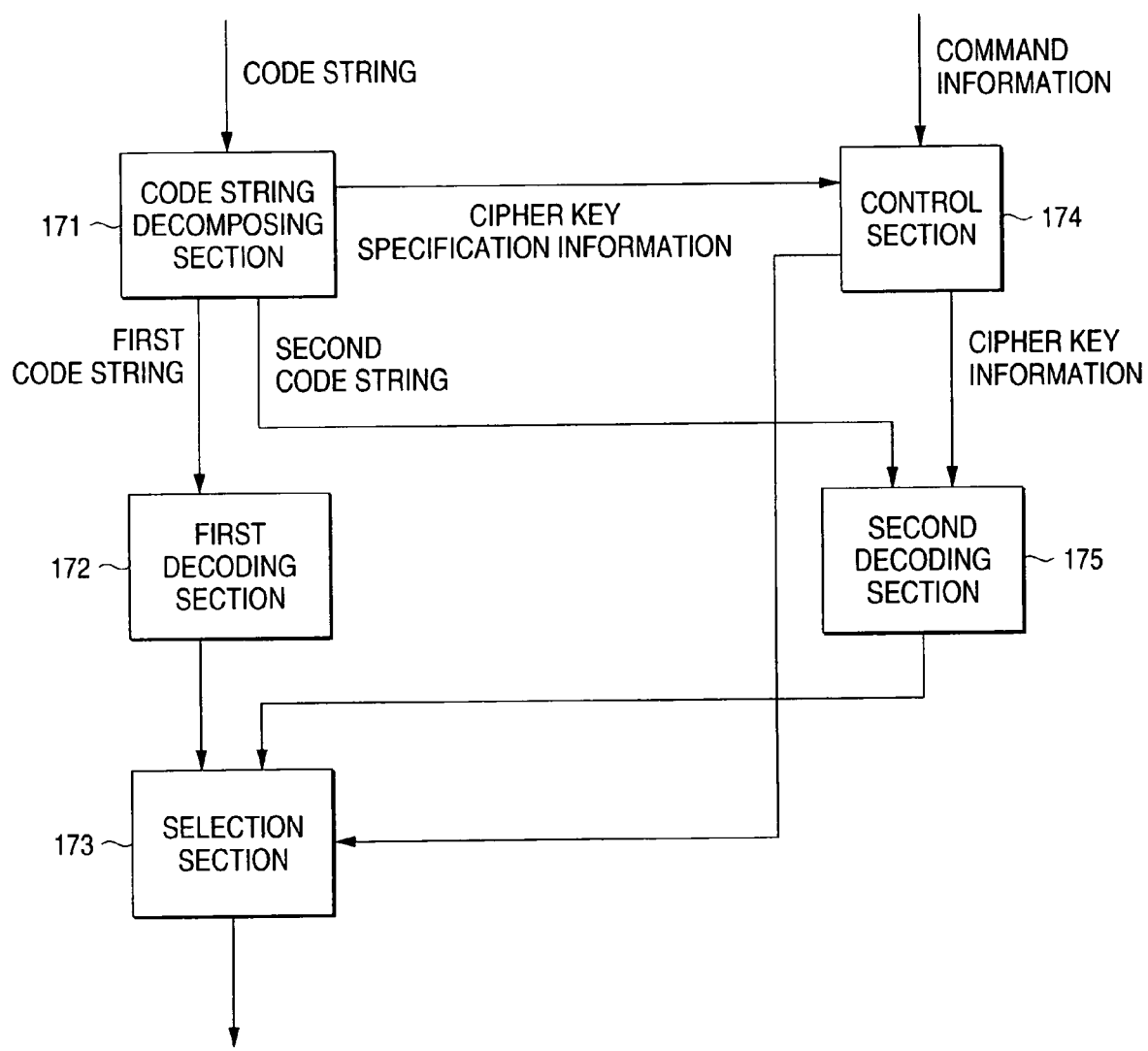
FIG. 25 is a block diagram to show another configuration example of an ATC decoder 18 in FIG. 5.

When the music signal thus recorded on the magneto-optic disc 11 is reproduced, the ATC decoder 18 in FIG. 5 uses functional blocks shown in FIG. 25 to execute reproduction processing. That is, a code string reproduced from the magneto-optic disc 11 is input to a code string decomposing section 171, which then extracts a first code string, a second code string, and cipher key specification information and supplies them to a first decoding section 172, a second decoding section 175, and a control section 174 respectively. Command information entered by the user who operates the key input operation section 23 is also input to the control section 174. When the user gives a command for reproducing the encrypted music signal, the control section 174 generates cipher key information (pseudo-random bit string) based on cipher key specification information (initial value information) input from the code string decomposing section 171 and outputs the generated cipher key information to the second decoding section 175.

The second decoding section 175 decodes the encrypted music signal (second code string) input from the code string decomposing section 171 based on the cipher key information input from the control section 174, and outputs the decoding result to a selection section 173. On the other hand, the first decoding section 172 decodes the unencrypted music signal (first code string) input from the code string decomposing section 171 and outputs the decoding result to the selection section 173. The selection section 173 selects output of either the first decoding section 172 or the second decoding section 175 in response to a control signal from the control section 174 and outputs the selected output through the D/A converter 19, the low-pass filter 20 from the terminal 21.

Figure 26:
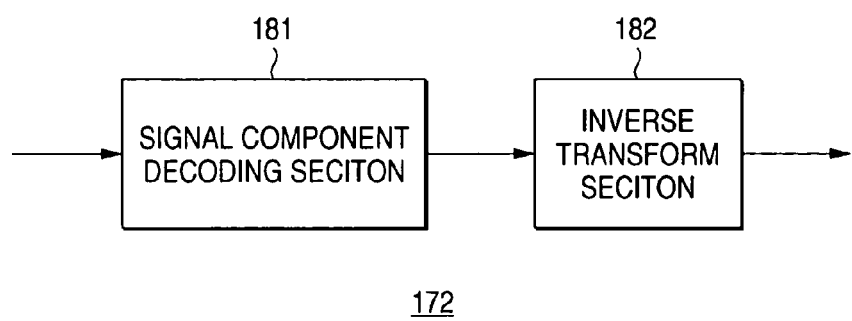
FIG. 26 is a block diagram to show a configuration example of a first decoding-section 172 in FIG. 25.

FIG. 26 shows a configuration example of the first decoding section 172. A signal component decoding section 181 decodes the code string input from the code string decomposing section 171 in ATC1 and outputs the decoding result to an inverse transform section 182, which then inversely transforms the spectrum component input from the signal component decoding section 181 into a signal on the time axis and outputs the signal.

The signal component decoding section 181 basically has a similar configuration to that of the signal component decoding section 112 in FIG. 19 (however, the signal component decoding section 112 in FIG. 19 performs decoding in ATC2; the signal component decoding section 181 performs decoding in ATC1). The inverse transform section 182 basically has a similar configuration to that of the inverse transform section 113 in FIG. 19 (therefore, the inverse transform section 113 in FIG. 22). (However, the inverse transform section 113 in FIG. 19 performs inverse transform processing in ATC2; the inverse transform section 182 performs inverse transform processing in ATC1.)

Figure 27:
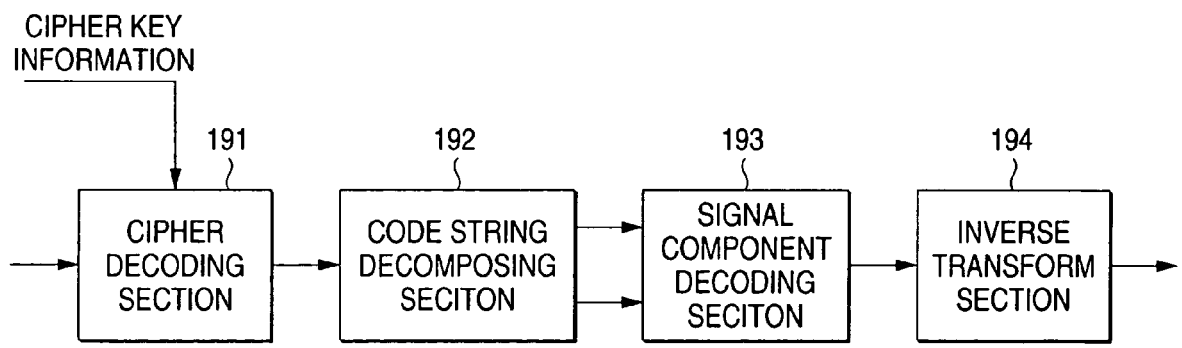
FIG. 27 is a block diagram to show a configuration example of a second decoding section 175 in FIG. 25.

FIG. 27 shows a configuration example of the second decoding section 175 in FIG. 25. A cipher decoding section 191 has a similar configuration to that of the cipher decoding section 91 in FIG. 17 (therefore the cipher decoding section 91 in FIG. 18). The cipher decoding section 191 decodes the second code string of the encrypted wide-band music signal coded in ATC2 input from the code string decomposing section 171 in response to the cipher key information input from the control section 174 and outputs the decoding result to a code string decomposing section 192, which then decomposes the input signal into a tone component and a non-tone component and outputs the components to a signal component decoding section 193. The signal component decoding section 193 basically has a similar configuration to that of the signal component decoding section 112 in FIG. 19 (therefore the signal component decoding section 112 in FIG. 20). However, the signal component decoding section 112 performs narrow-band decoding processing in ATC2; the signal component decoding section 193 performs wide-band decoding processing in ATC2.

Figure 28:
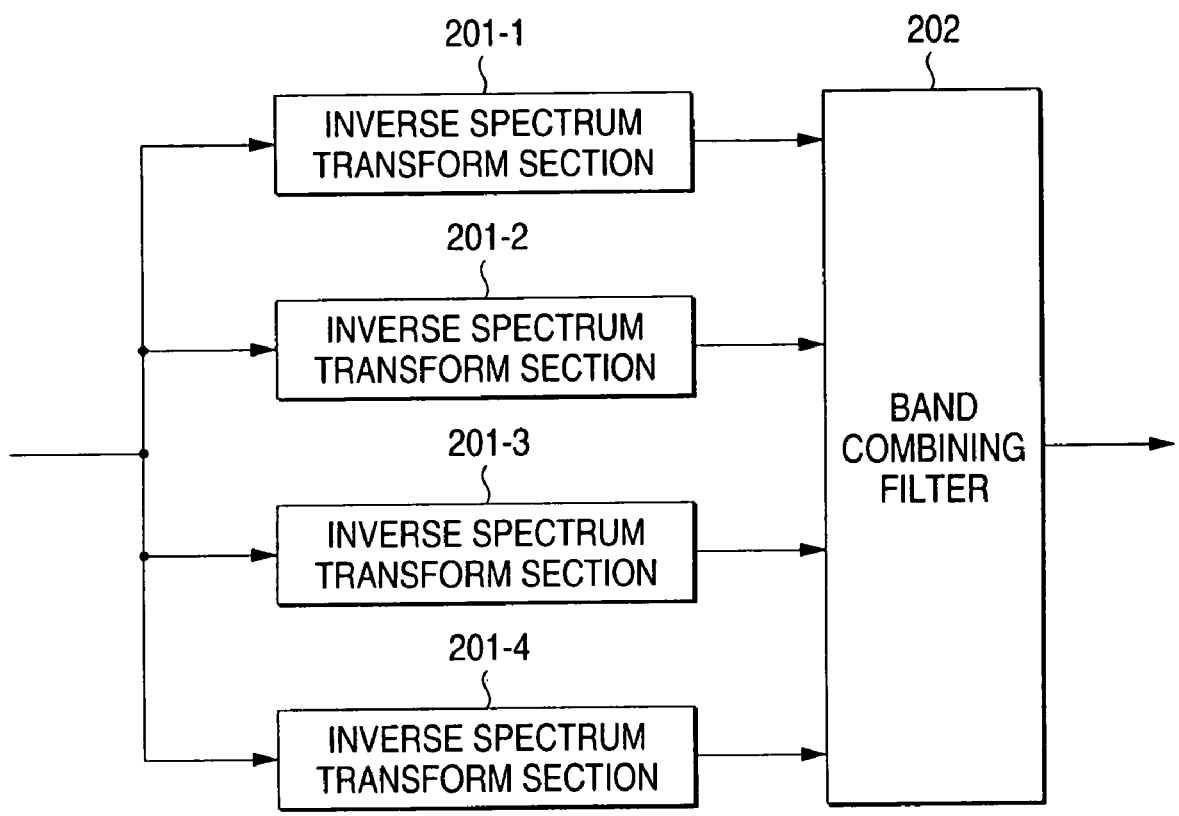
FIG. 28 is a block diagram to show a configuration example of an inverse transform section 194 in FIG. 27.

An inverse transform section 194 transforms the spectrum component input from the signal component decoding section 193 into a signal on the time axis. It basically performs similar processing to that of the inverse transform section 113 in FIG. 19. However, since the music signal to be processed is a wide-band music signal, the inverse transform section 194 is made up of inverse spectrum transform sections 201-1 to 201-4 and a band combining filter 202, as shown in FIG. 28. The inverse transform sections 141-1 and 141-2 in FIG. 22 correspond to the inverse spectrum transform sections 201-3 and 201-4 in low band of the inverse transform section 194 in FIG. 28. The inverse transform section 194 has also the inverse spectrum transform sections 201-1 and 201-2 for performing higher-band processing.

Figure 29:
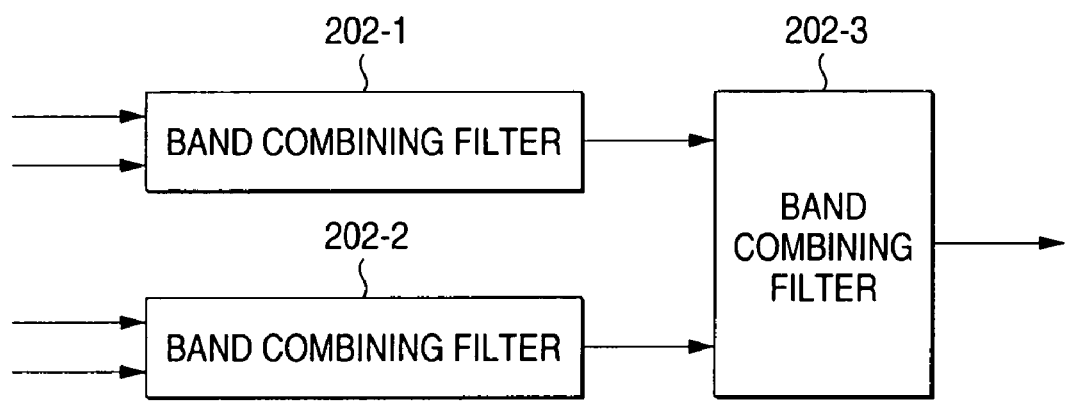
FIG. 29 is a block diagram to show a configuration example of a band combining filter 202 in FIG. 28.

The band combining filter 202 can be made of a PQF filter corresponding to the band splitting filter 51 in FIG. 8, but can also be made up of band combining filters 202-1 to 202-3 of QMF filters as shown in FIG. 29. In the band combining filter 202 in FIG. 29, the band combining filter 202-1 combines two bands of higher frequency bands and the band combining filter 202-2 combines two frequency-band signals of lower frequency bands. The band combining filter 202-3 combines output of the band combining filter 202-1 and output of the band combining filter 202-2.

Figure 30:
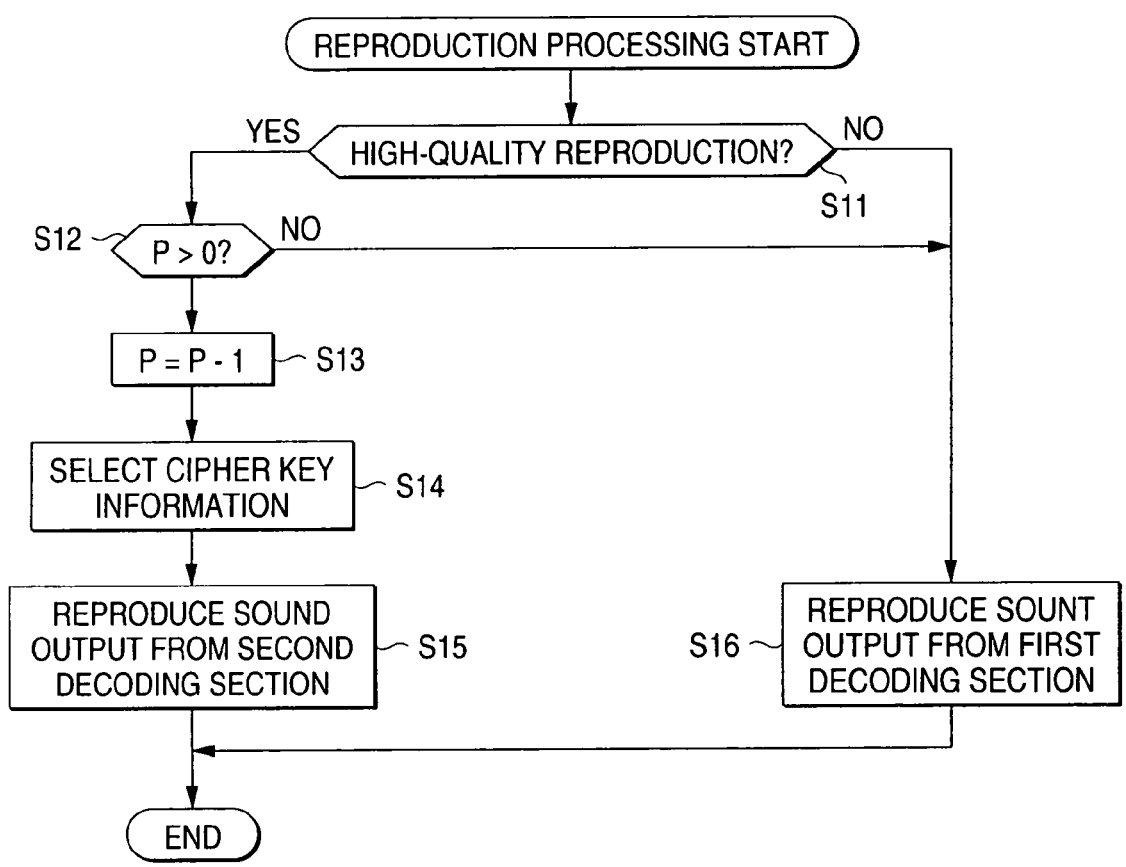
FIG. 30 is a flowchart to describe the operation of the ATC decoder 18 in FIG. 5.

Next, the operation of the reproducing system will be discussed with reference to a flowchart of FIG. 30. The user operates the key input operation section 23 to enter a command indicating reproduction of an encrypted wind-band music signal (pay) or an unencrypted narrow-band music signal (free) for a demonstration purpose. The command is input from the system controller 22 to the control section 174 of the ATC decoder 18. At step S11, the control section 174 determines whether or not high-quality music reproduction is specified based on the command information from the system controller 22. If narrow-band music signal (signal of first code string in FIG. 16) is specified, the control section 174 goes to step S16 and controls the selection section 173 so as to select output of the first decoding section 172.

That is, at this time, the first decoding section 172 decodes the signal of the first code string in FIG. 16 input from the code string decomposing section 171 in ATC1. The decode output is inversely quantized and is inversely normalized by the signal component decoding section 181. The inverse transform section 182 inversely transforms the inversely normalized spectrum component, combines bands, and outputs the result.

On the other hand, if high-quality music signal reproduction is specified, the control section 174 goes to step S12 and determines whether or not a previously stored value P is positive. The value P is a value supplied through the transmission medium 31 or a record medium to the user who pays a predetermined bill, for example, and encrypted pay information can be decoded (reproduced) as many times as the number indicated by the value P. If the control section 174 determines that the stored value P is positive, it goes to step S13 and decrements P by one, then goes to step S14 and generates cipher key information from an internal table based on the cipher key specification information (initial value) input from the code string decomposing section 171 and outputs the generated cipher key information to the second decoding section 175. Then, the control section 174 goes to step S15 and controls the selection section 173 so as to select output of the second decoding section 175.

That is, at this time, in the second decoding section 175, the cipher decoding section 191 uses the cipher key information input from the control section 174 to decode the encrypted code string (second code string in FIG. 16) input from the code string decomposing section 171. The code string decomposing section 192 decomposes the decoded code string into a tone component and a non-tone component and the signal component decoding section 193 decodes the tone and non-tone components in ACT2. That is, inverse quantization processing and inverse normalization processing are performed. The spectra of the decoded tone and non-tone components are combined and supplied to the inverse transform section 194, which then transforms the input spectrum components into the original signal on the time axis and combines for each frequency band, then outputs the result.

The encrypted music signal is thus reproduced. Each time the encrypted signal sequence is reproduced, the value P is decremented by one at step S13. Resultantly, the value P reaches 0 finally. At this time, at step S12, the value P is determined to be not greater than 0. In this case, control goes to step S16 and if the user specifies high-quality music signal reproduction, low-quality music is reproduced (played-back).

FIG. 31 shows another configuration example of functional blocks of the ATC encoder 6. This configuration example is a configuration example wherein a signal provided by combining an advertising voice signal and an encrypted pure music signal is supplied through the transmission medium 31.

Figure 32:
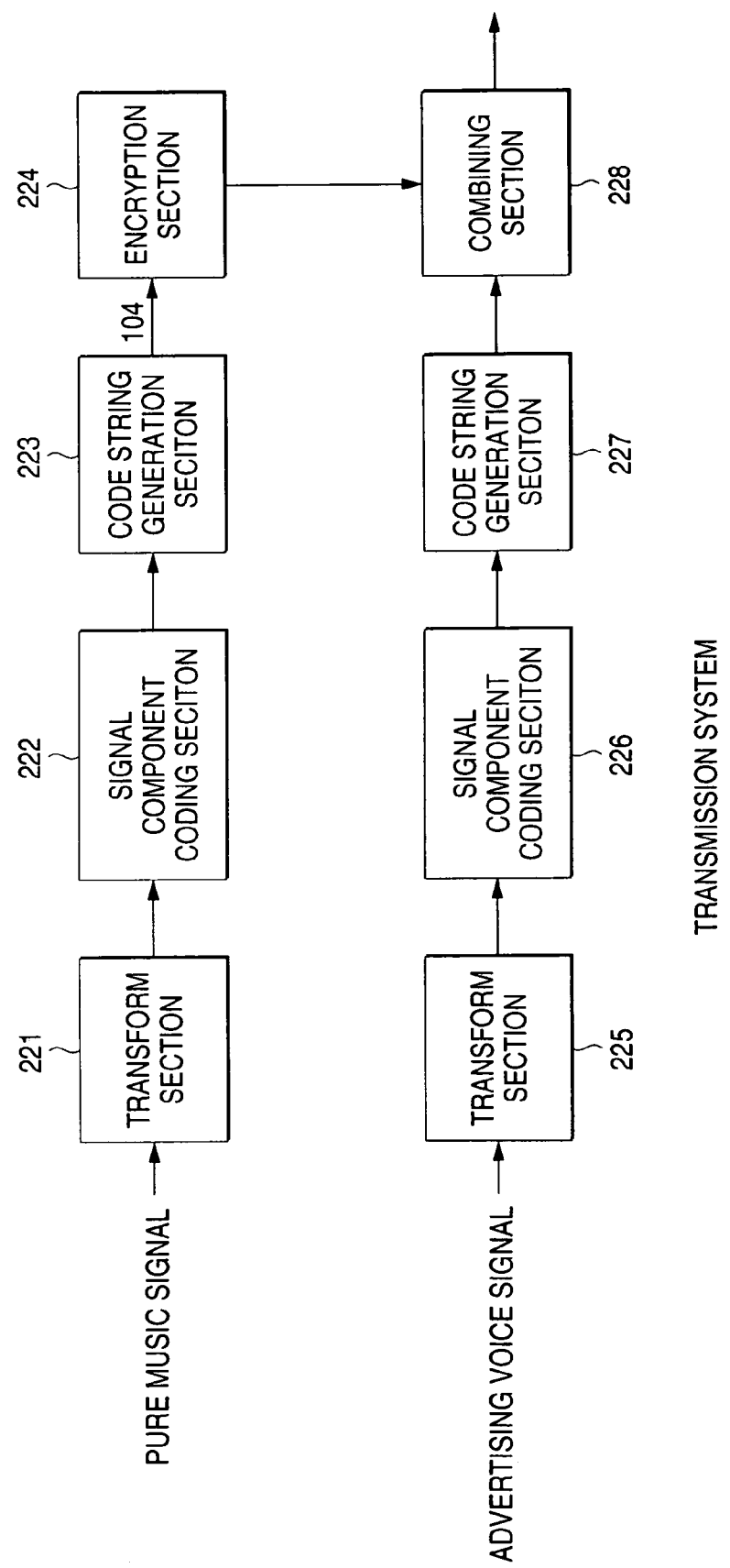
FIG. 32 is a block diagram to show a configuration example of a transmission system for transmitting a signal to a transmission medium 31 in FIG. 31.

That is, in this case, the transmission system for transferring a code string to the transmission medium 31 is made up of components as shown in FIG. 32. In this configuration example, the transmission system consists of a channel for coding a pure music signal and a channel for coding an advertising voice signal.

The pure music signal coding channel consists of a transform section 221, a signal component coding section 222, a code string generation section 223, and an encryption section 224. This configuration basically is similar to that of the transmission system consisting of the transform section 41, the signal component coding section 42, the code string generation section 43, and the encryption section 44 shown in FIG. 7.

On the other hand, the advertising voice signal coding channel consists of a transform section 225, a signal component coding section 226, and a code string generation section 227. This configuration basically is also similar to that of the transmission system comprising the transform section 41, the signal component coding section 42, and the code string generation-section 43 shown in FIG. 7. However, the coded signal is the advertising voice signal rather than the music signal.

A combining section 228 combines the code string of the encrypted pure music signal coded in ATC2 output from the encryption section 224 and the code string of the advertising voice signal coded in ATC2 output from the code string generation section 227 and outputs the result to the transmission medium 31 in FIG. 31.

Figure 33:
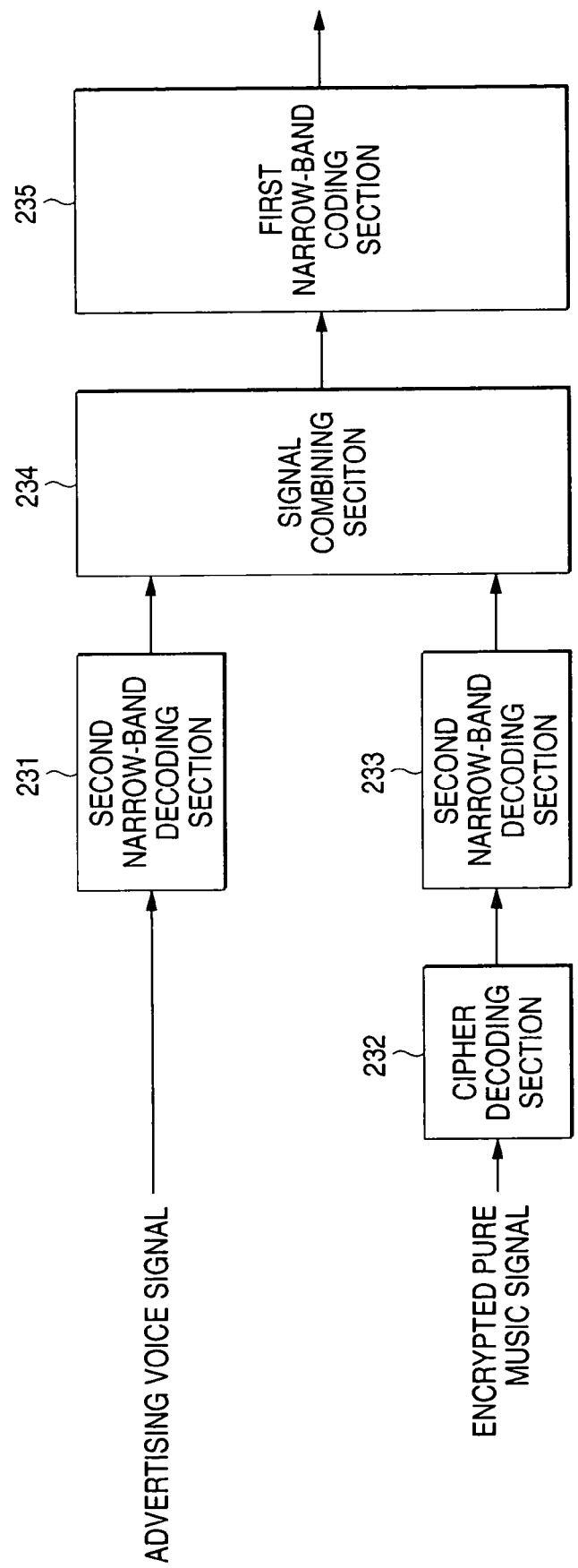
FIG. 33 is a block diagram to show a configuration example of a signal transform and combining section 212 in FIG. 31.

When the ATC encoder 6 of the magneto-optic disc unit 30 receives input of the advertising voice signal plus the encrypted pure music signal through the transmission medium 31 in FIG. 31, a signal string separation section 211 separates the input signal into advertising voice signal and encrypted pure music signal and outputs the advertising voice signal to a signal transform and combining section 212 and also outputs the encrypted pure music signal to the signal transform and combining section 212 and a code string combining section 213. The signal transform and combining section 212 is made up of components, for example, as shown in FIG. 33.

That is, a second narrow-band decoding section 231 decodes the code string of the advertising voice signal supplied from the signal string separation section 211 in ATC2 and outputs the result to a signal combining section 234. A cipher decoding section 232 deciphers the encrypted pure music signal input from the signal string separation section 211 and outputs the result to a second narrow-band decoding section 233, which then decodes the input code string of the pure music signal to narrow band in ATC2 and outputs the result to the signal combining section 234.

Each of the second narrow-band decoding section 231 and the second narrow-band decoding section 233 basically has a similar configuration to that of the second narrow-band decoding section 92 in FIG. 17 (and FIG. 19) and the cipher decoding section 232 basically has a similar configuration to that of the cipher decoding section 91 in FIG. 17 (FIG. 18) for executing similar processing to that described above.

The signal combining section 234 combines the advertising voice signal input from the second narrow-band decoding section 231 and the pure music signal input from the second narrow-band decoding section 233 into a signal and outputs the resultant signal to a first narrow-band coding section 235, which then codes the input signal in ATC1 and outputs the result to the code string combining section 213. The first narrow-band coding section 235 basically has a similar configuration to that of the first narrow-band coding section 93 in FIG. 17 (FIG. 23).

The code string combining section 213 in FIG. 31 combines the resultant signal of the music signal and the advertising voice signal coded in ATC1 input from the first narrow-band coding section 235 of the signal transform and combining section 212 and the encrypted pure music signal supplied from the signal string separation section 211 and supplies the result to the recording section 34 for recording the result on the magneto-optic disc 11.

Figure 34:
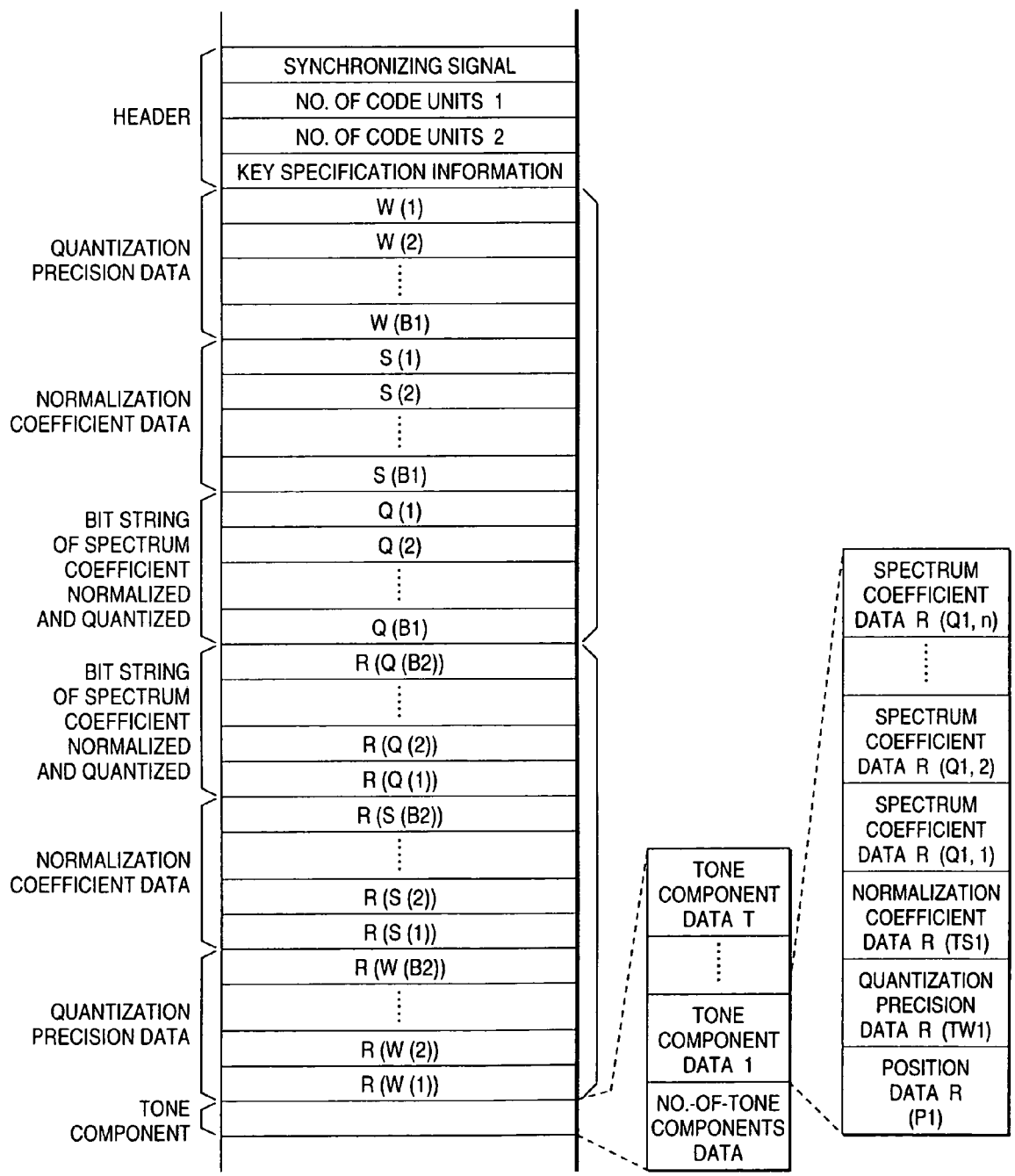
FIG. 34 is a drawing to describe output of a code string combining section 213 in FIG. 31.

FIG. 34 shows a format example of a code string thus output from the code string combining section 213. The code string consists of a header, resultant signal of music and advertising voice signals coded in ATC1, and pure music signal coded in ATC2. The header consists of a synchronizing signal, the number of code units of the resultant signal of music and advertising voice signals (number of code units 1), the number of code units of pure music signal (number of code units 2), and key specification information.

The resultant signal of music and advertising voice signals is made up of quantization precision data (W(1) to W(B1)), normalization coefficient data (S(1) to S(B1)), and spectrum coefficient (Q(1) to Q(B1)). The pure music signal is classified into a tone component and a non-tone component and the non-tone component is made up of encrypted spectrum coefficient (R(Q(B2)) to R(Q(1))), encrypted normalization coefficient data (R(S(B2)) to R(S(1)), and encrypted quantization precision data (R(W(B2)) to R(W(1))).

The tone component is made up of tone component data T to tone component data 1 and encrypted number-of-tone-components- data. The tone component data 1 (like tone component data 2 to tone component data T) is made up of encrypted position data R(P1), encrypted quantization precision data R(TW1), encrypted normalization coefficient data R(TS1), and n encrypted spectrum coefficient data pieces R(Q1, 1) to R(Q1, n) (placed in reverse order).

In this case, reproduction processing can also be performed as previously described with reference to FIGS. 25 and 30.

In the example in FIG. 34, the pure music signal data is placed in the order (R(Q(B2)), . . . , R(Q(2)), R(Q(1)) reverse to the time series order (for example, R(Q(1)), R(Q(2)), R(Q(B2)), whereby the top position of the pure music data need not be found by calculation as the position just after the last data Q(B1) of (music+advertising voice) signal. (That is, a rule may be made so as to always reproduce the data in the reverse direction starting at the last data (number-of-tone-components data).)

In the example in FIG. 31, the encrypted pure music signal transmitted from the transmission medium 31 is recorded through the recording section 34 on the record medium as it is. However, it can also be recorded on the record medium with the cipher changed for more enhancing safety. FIG. 35 shows a configuration example applied for this purpose.

Figure 36:
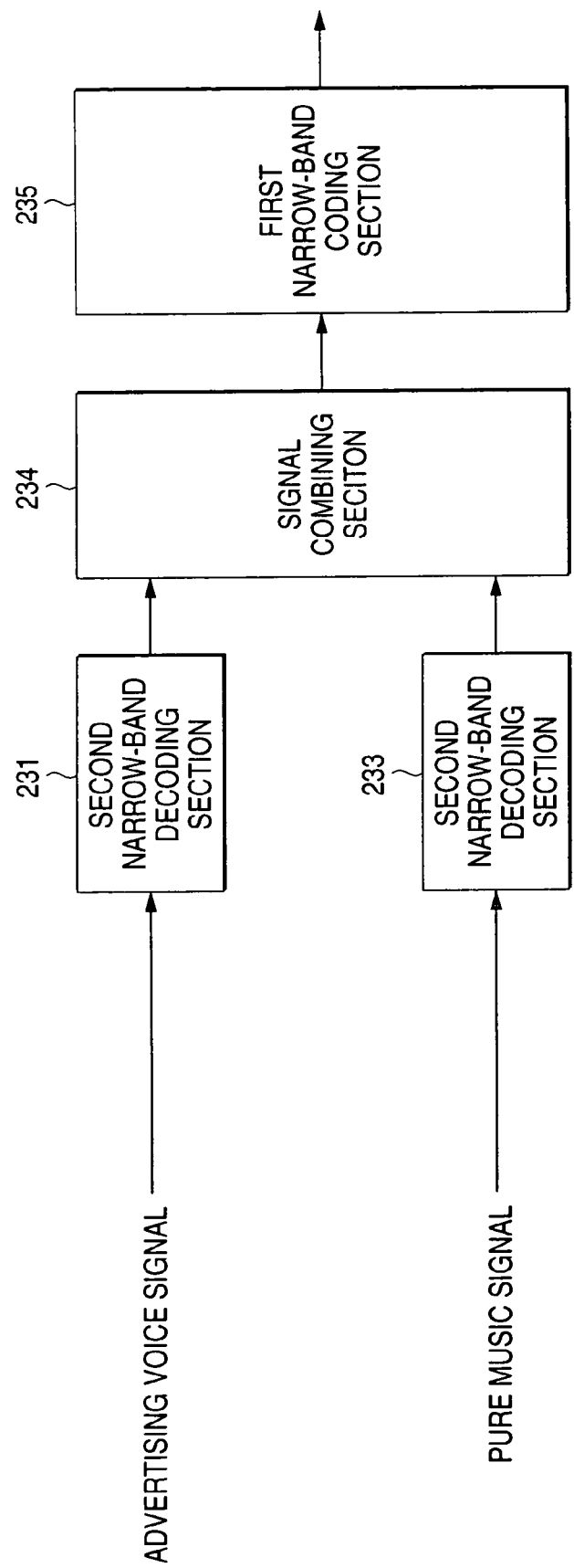
FIG. 36 is a block diagram to show a configuration example of the signal transform and combining section 212 in FIG. 35.

That is, in the configuration example in FIG. 35, the encrypted pure music signal separated by the signal string separation section 211 is deciphered by a cipher decoding section 216 and is supplied to the signal transform and combining section 212 as pure music signal. Therefore, the signal transform and combining section 212 is configured as shown in FIG. 36. As seen from comparison of the signal transform and combining section 212 in FIG. 36 with the signal transform and combining section 212 in FIG. 33, the signal transform and combining section 212 in FIG. 36 does not comprise the cipher decoding section 232 in the signal transform and combining section 212 in FIG. 33; other components are similar to those previously described with reference to FIG. 33.

The pure music signal output from the cipher decoding section 216 is supplied to an encryption section 217, which then encrypts the pure music signal based on proper cipher key information in the ATC encoder 6, then supplies the encrypted pure music signal to the code string combining section 213, whereby the cipher of the pure music signal transmitted from the transmission medium 31 differs from that of the pure music signal recorded through the recording section 34 on the magneto-optic disc 11, so that safety can be more enhanced.

The cipher decoding section 216 has a similar configuration to that of the cipher decoding section 91 shown in FIG. 18. The decoding section 217 has a similar configuration to that of the decoding section 44 shown in FIG. 14.

The configuration examples shown in FIGS. 31 and 35 assume that the encrypted pure music signal and the unencrypted advertising voice signal are supplied to the transmission medium 31. However, if neither the pure music signal nor the advertising voice signal is encrypted, the ATC encoder 6 can be configured, for example, as shown in FIG. 37 for recording a signal similar to that shown in FIG. 34 on the magneto-optic disc 11.

Figure 37:
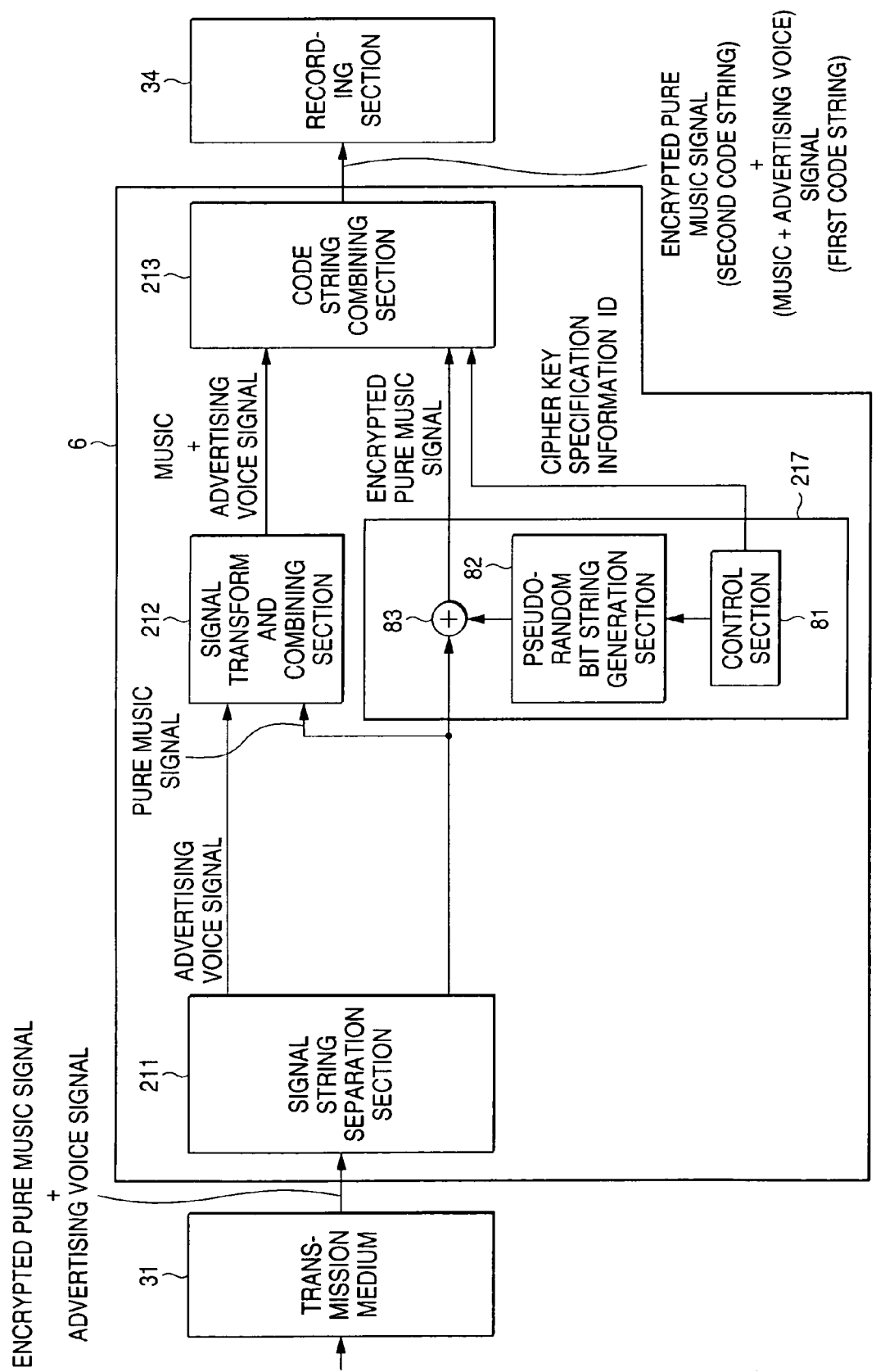
FIG. 37 is a block diagram to show still another configuration example of the ATC encoder 6 in FIG. 5.

That is, in the configuration example in FIG. 37, the cipher decoding section 216 in FIG. 35 is not provided. Other components and the operation of the components are similar to those previously described with reference to FIG. 35 and therefore will not be discussed again.

Figure 38:
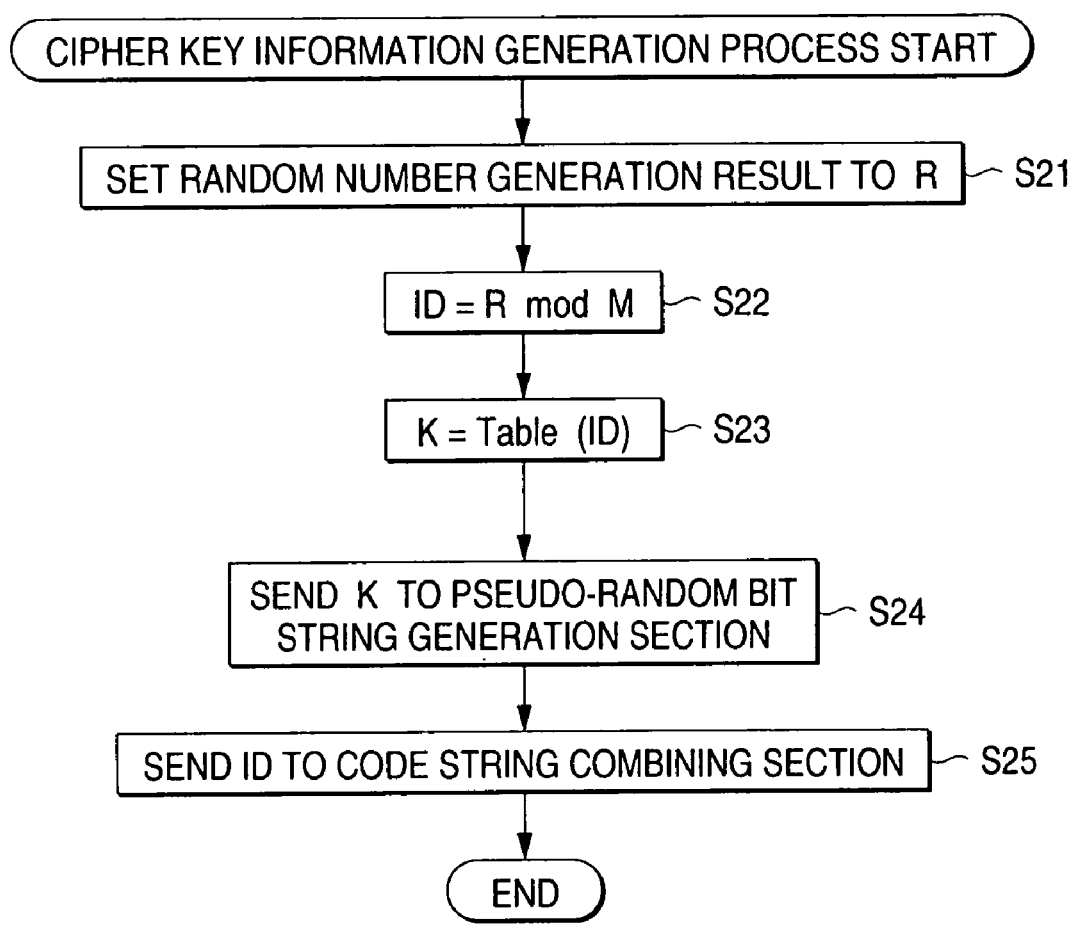
FIG. 38 is a flowchart to describe the operation of a control section 81 in FIG. 35.

FIG. 38 shows cipher key information sending processing performed by a control section 81 in the encryption section 217 in FIG. 35. That is, first at step S21, the control section 81 generates a random number in response to an instruction from the system controller 22 and sets the random number to R. At step S22, the control section 81 divides the random number R by a predetermined value M and adopts the remainder of the division operation as cipher key specification information ID.

Next, at step S23, the control section 81 makes reference to an internal table for converting the cipher key specification information ID provided at step S22 into corresponding cipher key information K. At step S24, the control section 81 sends the cipher key information K provided at step S23 to a pseudo-random bit string generation section 82 for generating a pseudo-random bit string. At step S25, the control section 81 outputs the cipher key specification information ID provided at step S22 (or the cipher key information K provided at step S23) to the code string combining section 213.

Figure 39:
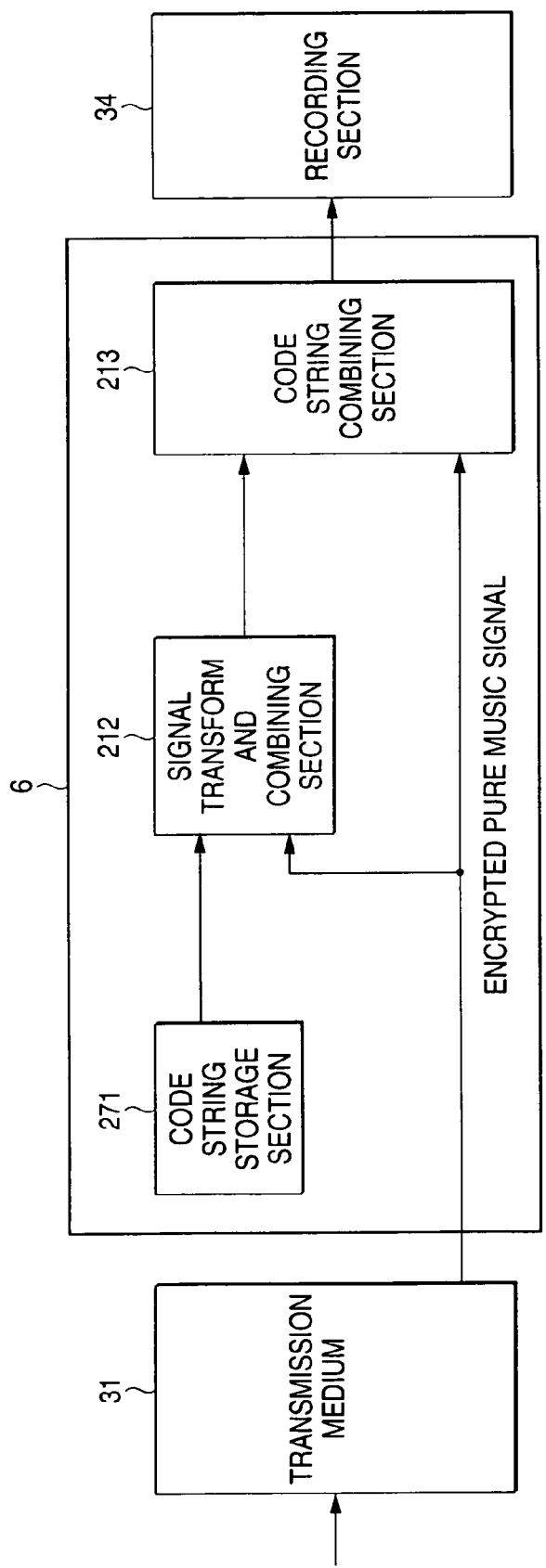
FIG. 39 is a block diagram to show still another configuration example of the ATC encoder 6 in FIG. 5.

In the example in FIG. 31, the advertising voice signal is transmitted through the transmission medium 31 from the transmission system, but can also be previously stored in the ATC encoder 6. FIG. 39 shows a configuration example applied for this purpose.

That is, in the configuration example in FIG. 39, a code string storage section 271 previously stores an advertising voice signal and supplies the stored advertising voice signal directly to signal transform and combining section 212. Therefore, in this case, only an encrypted pure music signal needs to be transmitted through the transmission medium 31. In this case, a similar function to that shown in FIG. 31 can also be provided.

Figure 40:
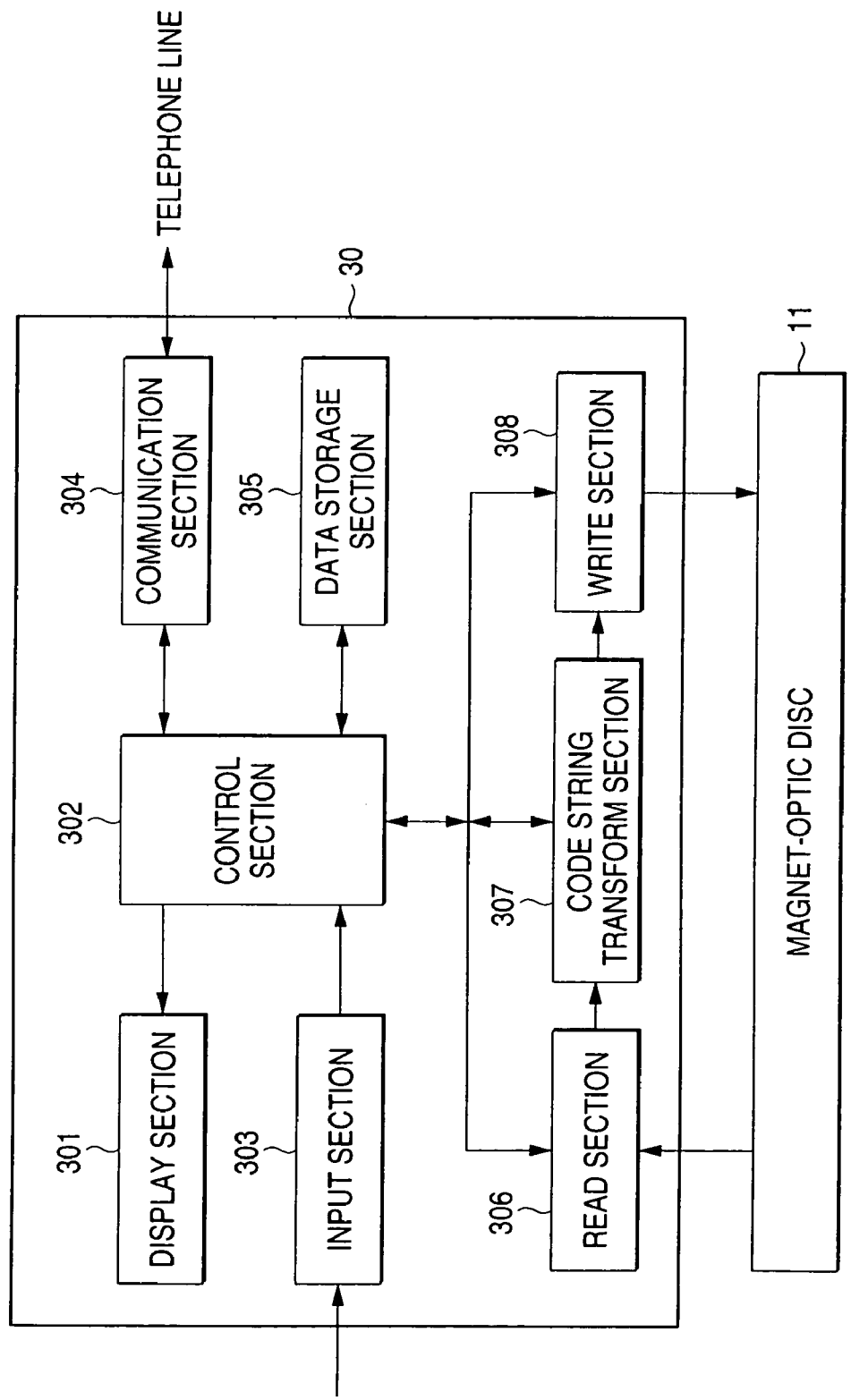
FIG. 40 is a block diagram to show another configuration example of the magneto-optic disc unit 30 in FIG. 5.

When a signal as shown in FIG. 16 is recorded on the magneto-optic disc 11 or a signal is transmitted through the transmission medium 31 in a format as shown in FIG. 16 and then is recorded on the magneto-optic disc 11, the signal can be further converted into any other format. FIG. 40 shows a configuration example applied for this purpose.

In the configuration example in FIG. 40, the user enters a predetermined command in a control section 302 through an input section 303. The control section 302 causes a display section 301 to display various pieces of information. A communication section 304 transmits and receives various pieces of information over a telephone line, etc. A data storage section 305 stores a value P representing the number of times encrypted information can be decoded. Like the value described above, the value P is transmitted through the communication section 304 or is given by the authorized party to the user who purchases a memory card, etc., and is stored in the data storage section 305.

The control section 302 controls a read section 306 so as to read the data recorded on the magneto-optic disc 11 therefrom and output the read data to a code string transform section 307. The code string transform section 307 transforms the input data into predetermined data and supplies the predetermined data to a write section 308, which then records the code string supplied from the code string transform section 307 on the magneto-optic disc 11.

Figure 41:
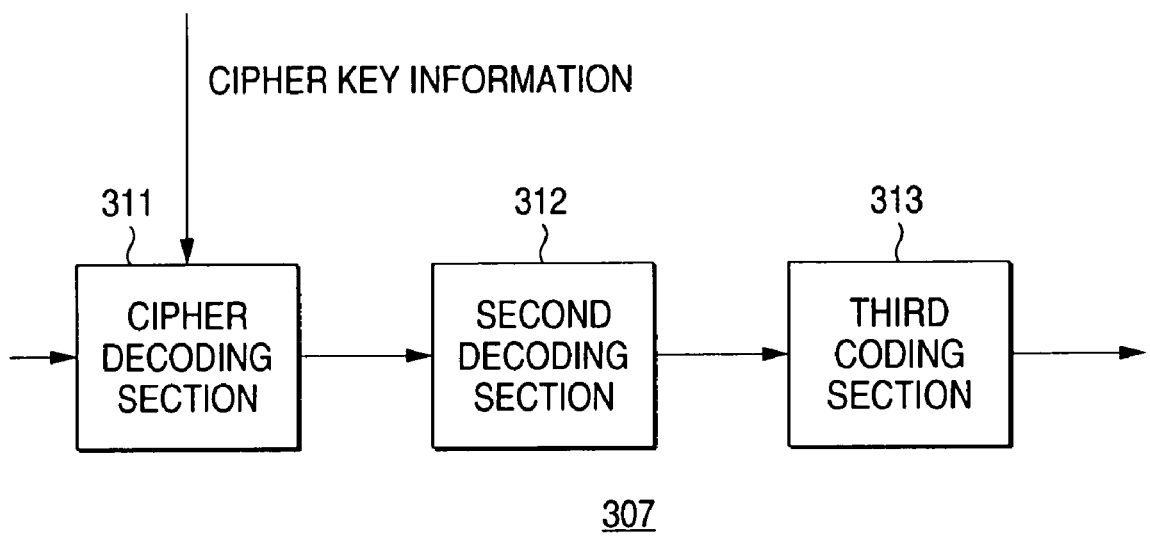
FIG. 41 is a block diagram configuration example of a code string transform section 307 in FIG. 40.

The code string transform section 307 is made up of components, for example, as shown in FIG. 41. In the figure, a cipher decoding section 311 decodes encrypted reproduction data supplied from the read section 306 based on cipher key information input from the control section 302 and outputs the result to a second decoding section 312, which then decodes the data input from the cipher decoding section 311 in ATC2 and outputs the result to a third coding section 313, which then codes the data input from the second decoding section 312 in ATC1 and outputs the result to the write section 308.

The display section 301 in FIG. 40 corresponds to the display section 24 in FIG. 5, the input section 303 corresponds to the key input operation section 23, and the control section 302, the communication section 304, and the data storage section 305 correspond to the system controller 22.

The read section 306 corresponds to the optical head 13, the RF circuit 14, the decoder 16, and the RAM 17. The write section 308 corresponds to the RAM 7, the encoder 8, the magnetic head drive circuit 9, and the magnetic head 10. The code string transform section 307 corresponds to the ATC encoder 6 and the ATC decoder 18.

Figure 42:
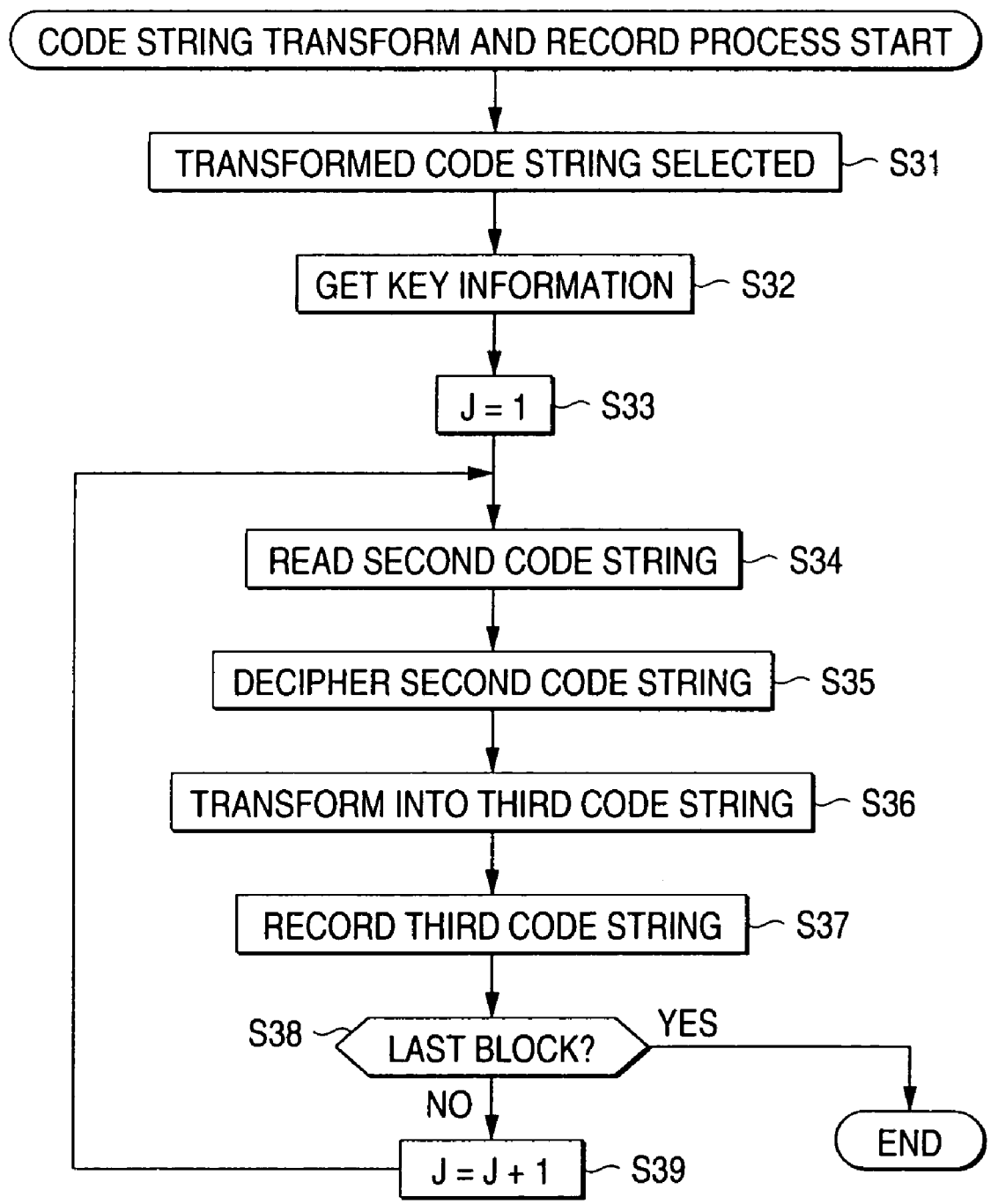
FIG. 42 is a flowchart to describe the operation of a control section 302 in FIG. 40.
Figure 43:
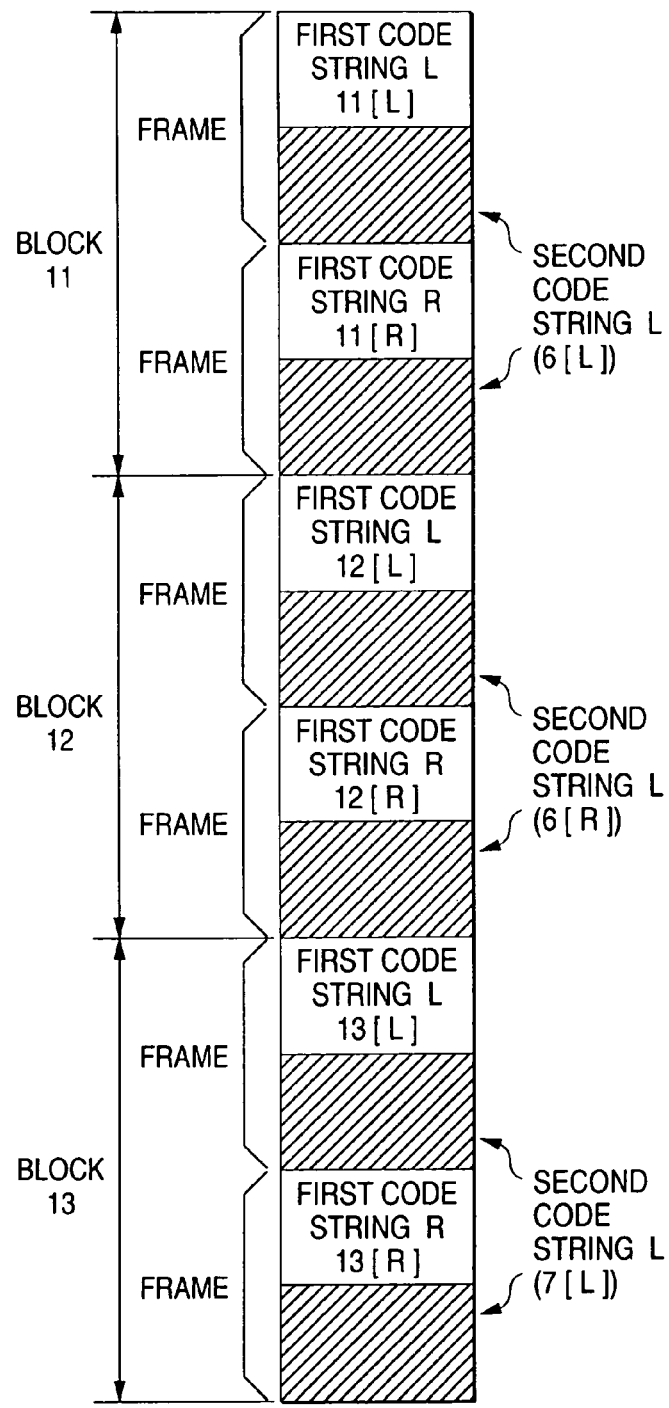
FIGS. 43A and 43B are drawings to describe the operation of the magneto-optic disc unit 30 in FIG. 40.
Figure 43:
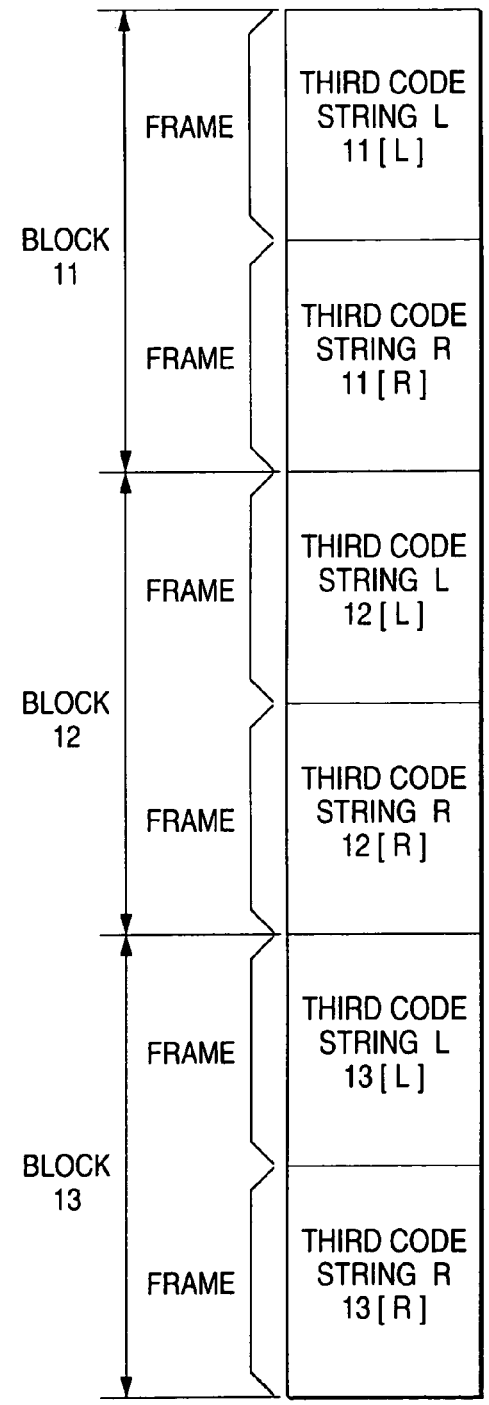

Next, the operation of the control section 302 will be discussed with reference to a flowchart of FIG. 42. First and second code strings are already recorded on the magneto-optic disc 11 as shown in FIG. 43A. In this state, first at step S31, the user operates the input section 303 for selecting the code string to be transformed. The selection result is sent to the control section 302 as a command. Now assume that the second code string shown in FIG. 43 is selected as the code string to be transformed. When the code string to be transformed is selected, if cipher key information is required for transforming the code string, the control section 302 accesses a predetermined center through the communication section 304 and acquires necessary cipher key information. Alternatively, cipher key information may be previously stored in the data storage section 305. Next, at step S33, the control section 302 initializes a variable J representing the block number in the code string to a value of 1.

At step S34, the control section 302 controls the read section 306 so as to read the second code string selected at step S31. The second code string is supplied from the read section 306 to the cipher decoding section 311 of the code string transform section 307. At step S35, the control section 302 controls the cipher decoding section 311 so as to decipher the second code string supplied from the read section 306. At this time, the necessary cipher key information is supplied from the control section 302 to the cipher decoding section 311.

Next, at step S36, the control section 302 controls the second decoding section 312 so as to decode in ATC2 the deciphered second code string output from the cipher decoding section 311. The data of the second code string decoded is supplied to the third coding section 313. Then, the control section 302 controls the third coding section 313 so as to code the data of the second code string input from the second decoding section 312 as a third code string in ATC1. The third code string provided by the third coding section 313 (corresponding to the first code string) is supplied to the write section 308.

At step S37, the control section 302 controls the write section 308 so as to record the third code string output from the third coding section 313 on the magneto-optic disc 11 as shown in FIG. 43B.

Next, the control section 302 goes to step S38 and determines whether or not the variable J set at step S33 indicates the last block. If the variable J does not indicate the last block, the control section 302 goes to step S39 and increments the variable J by one, then returns to step S34 and repeats the step and the later steps. If it is determined at step S38 that the variable J indicates the last block, the code string transform and record process is terminated.

As shown in FIG. 43, the write section 308 replaces the first and second code strings with the third code string in the area where the first and second code strings are recorded. Therefore, after this, it is made possible for the user to reproduce the music signal of the third code string (corresponding to the first code string) any number of times at no charge.

Figure 44:
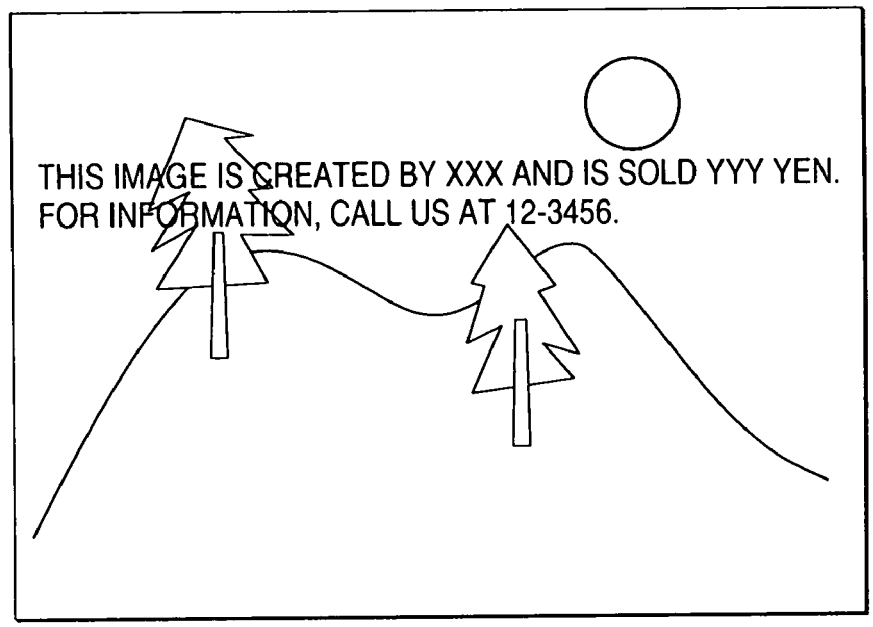
FIGS. 44A and 44B are drawings to show image display examples.
Figure 44:
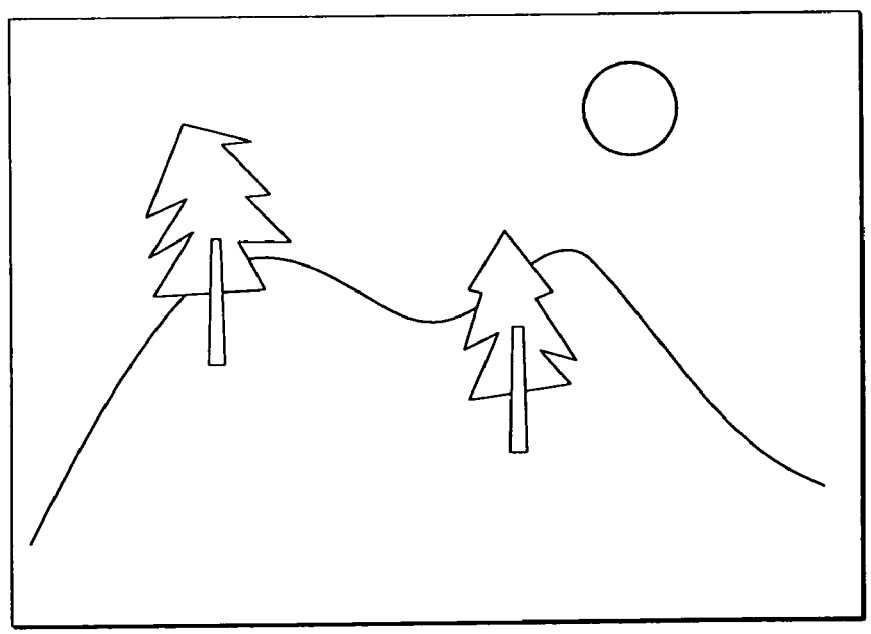

The invention has been described mainly taking audio signal as an example. However, as shown in FIG. 44, the invention can also be applied to image signal. This topic will be discussed corresponding to the example in FIG. 31. Encrypted image signal (FIG. 44B) and image information of advertising text unencrypted are combined and the result is transmitted through the transmission medium 31. The signal string separation section 211 separates the input into image information of advertising text and encrypted image signal and outputs the former to the signal transform and combining section 212 and the latter to the signal transform and combining section 212 and the code string combining section 213. The signal transform and combining section 212 combines the image information of advertising text and normal image information into an image (FIG. 44A). The code string combining section 213 combines the image input from the signal transform and combining section 212 (FIG. 44A) and the image input from the signal string separation section 211 (FIG. 44B) and supplies the resultant image to the recording section 34 for recording the resultant image on the magneto-optic disc 11.

In the description made so far, advertising voice signal or advertising text signal is adopted as the signal superimposed on the music signal or image signal. However, any other acoustic signal or image signal can also be used. For example, some noise signal may be added to the original music signal or image signal.

Further, the second code string may be transmitted and recorded without being encrypted. In doing so, it is made possible for the person who buys a comparatively expensive reproducer that can decode both the first and second code strings to receive better service than the person who buys a comparatively inexpensive reproducer that can decode only the first code string (code string coded in ATC1) to receive.

Thus, for example, it is made possible to easily provide only high-quality music for the user who wants to enjoy music with no advertising voice by paying a bill while the data contents such as music are advertised. Further, it is made possible to maintain the high quality of music signal without being conscious about the part on which advertising voice is superimposed. It is also made possible to provide high-quality information regardless of the record position of the signal superimposed as information for a demonstration purpose as compared with the case where a cancel signal is transmitted. Further, it is made possible for the user to reliably use information at no charge after the user once pays a bill.

The coding system with higher compression efficiency (ATC2) makes it possible to provide the user with music for a demonstration purpose (music in ATC1) together with high-quality music (music in ATC2) as main information even on a narrow-band transmission line.

Further, it is made possible for the user to reproduce (play back) music with a comparatively inexpensive reproducer having a decoding function as he or she desired after once paying a bill.

As distribution media for distributing a computer program for performing processing as described above to the user, communication media such as a network and a satellite can be used in addition to record media such as magnetic disk, CD-ROM, and solid-state memory.

As described above, according to the information recording and reproducing system, the information recording and reproducing method, and the distribution means of the invention, the second information generated from the first information input is combined with the first information and the resultant information is recorded on the record medium. Thus, for example, it is made possible to easily and surely provide the first information as the main information and the second information for a demonstration purpose.

According to the information recording and reproducing system, the information recording and reproducing method, and the distribution means of the invention, the first input information coded in the first coding system is combined with the second information and the resultant information is coded in the second coding system, then the provided information and the first information are recorded on the record medium. Thus, it is made possible for the receiving party to record, for example, not only the first information as the main information, but also the information for a demonstration purpose provided by coding the first information and the second information in the second coding system on the record medium.

According to the information recording and reproducing system, the information recording and reproducing method, and the distribution means of the invention, the first information is encrypted based on the cipher key information and the first information and the second information coded are combined and recorded on the record medium. Thus, it is made possible to more enhance the security of the first information as the main information.

According to the information recording and reproducing system, the information recording and reproducing method, and the distribution means of the invention, the first information encrypted and coded in the first coding system is again coded in the second coding system as the second information, which is then recorded on the record medium. Thus, for example, a record medium recording the second information that can be used at no charge from the first information encrypted after the user once pays a bill can be provided.

According to the information recording and reproducing system, the information recording and reproducing method, and the distribution means of the invention, the second information is reproduced from the record medium recording the first information coded in the first coding system and the second information coded in the second coding system and is again coded in the first coding system as the third information, which is then recorded on the record medium. Thus, for example, it is made possible to provide a record medium recording third information that can be used at no charge after the user once pays bill from the record medium recording both the second information as the main information and the first information for a demonstration purpose.

What is claimed is:

1. An information processing apparatus, comprising:
   a separator that separates a first code string comprising a second code string and an encrypted third code string into the second and third code strings and outputs the second and encrypted third code strings, the first code string comprising an audio signal having spectrum components including a tone component and non-tone component;
   a cipher decoder that deciphers the encrypted third code string using a cipher key specification identification received from the separator and outputs a deciphered third code string;
   a first combiner that combines the deciphered third code string with the second code string and outputs a combined code string comprising the second code string and the deciphered third code string;
   an encryption section that encrypts the deciphered third code string into a re-encrypted third code string using the cipher key specification identification and outputs a re-encrypted third code string;
   a second combiner that combines the combined code string and the re-encrypted third code string and outputs a resultant code string comprising the combined code string and the re-encrypted code string;
   determination means for determining whether to output the combined code string or the re-encrypted third code string;
   billing means for performing billing processing if it is determined that the re-encrypted third code string is to output; and
   outputting means for outputting the determined one of the combined code string and the re-encrypted third code string,
   wherein the combined code string is a demonstration purpose code string, and
   wherein the first code string is coded in a first encoding algorithm and the re-encrypted third code string is coded in a second encoding algorithm different than the first encoding algorithm.

2. The information processing apparatus as claimed in claim 1, wherein the third code string is a signal in a frequency band of a low band of the first code string.

3. The information processing apparatus as claimed in claim 1, wherein the separator further includes:
   separation means for separating from the first code string, which has the tone component and the non-tone component separated and spectrum components thereof coded, the tone component and the non-tone component;
   component decoding means for decoding the tone component and the non-tone component provided by the separation means; and
   spectrum combining means for combining spectrum components of the tone component and the non-tone component decoded by the component decoding means.

4. The information processing apparatus as claimed in claim 3, further comprising:
   transform means for transforming the resultant spectrum component provided by the spectrum combining means into a signal on a time axis.

5. An information processing method in an information processing apparatus, said method comprising:
   a separation step of separating a first code string comprising a second code string and an encrypted third code string into the second code string and the encrypted third code string, the first code string comprising an audio signal having spectrum components including a tone component and a non-tone component;
   a cipher decoding step of deciphering the encrypted third code string using a cipher key specification identification into a deciphered third code string;
   a first combining step of combining the deciphered third code string with the second code string into a combined code string comprising the second code string and the deciphered third code string;

an encryption step of encrypting the deciphered third code string into a re-encrypted third code string using the cipher key specification identification;

a second combining step of combining the combined code string and the re-encrypted third code string into a resultant code string comprising the combined code string and the re-encrypted code string;

a determination step of determining whether to output the combined code string or the re-encrypted third code string;

a billing step of performing billing processing if it is determined that the re-encrypted third code string is to output; and an output step of outputting the determined one of the combined code string and the re-encrypted third code string, wherein the first code string is coded in a first encoding algorithm and the re-encrypted third code string is coded in a second encoding algorithm different than the first encoding algorithm, and wherein the combined code string is a demonstration purpose code string.

6. A distribution medium including a computer-readable program for causing an information processing apparatus to execute processing comprising the following steps:

a separation step of separating a first code string comprising a second code string and an encrypted third code string into the second code string and the encrypted third code string, the first code string comprising an audio signal having spectrum components including a tone component and a non-tone component;

a cipher decoding step of deciphering the encrypted third code string using a cipher key specification identification into a deciphered third code string;

a first combining step of combining the deciphered third code string with the second code string into a combined code string comprising the second code string and the deciphered third code string;

an encryption step of encrypting the deciphered third code string into a re-encrypted third code string using the cipher key specification identification;

a second combining step of combining the combined code string and the re-encrypted third code string into a resultant code string comprising the combined code string and the re-encrypted code string;

a determination step of determining whether to output the combined code string or the re-encrypted third code string;

a billing step of performing billing processing if it is determined that the re-encrypted third code string is to output; and an output step of outputting the determined one of the combined code string and the re-encrypted third code string, wherein the first code string is coded in a first encoding algorithm and the re-encrypted third code string is coded in a second encoding algorithm different than the first encoding algorithm, and wherein the combined code string is a demonstration purpose code string.

* * * * *